(12) United States Patent
Li et al.

(10) Patent No.: US 11,908,049 B2
(45) Date of Patent: Feb. 20, 2024

(54) DATA PROCESSING DEVICE AND METHOD, ELECTRONIC APPARATUS FOR DATA VISUALIZATION

(71) Applicants: Beijing Zhongxiangying Technology Co., Ltd., Beijing (CN); BOE TECHNOLOGY GROUP CO., LTD., Beijing (CN)

(72) Inventors: Shuyi Li, Beijing (CN); Wenjuan Li, Beijing (CN); Guangyu Shao, Beijing (CN); Hong Wang, Beijing (CN)

(73) Assignees: BEIJING ZHONGXIANGYING TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 166 days.

(21) Appl. No.: 17/620,613

(22) PCT Filed: Dec. 26, 2020

(86) PCT No.: PCT/CN2020/139721
§ 371 (c)(1),
(2) Date: Dec. 17, 2021

(87) PCT Pub. No.: WO2022/134115
PCT Pub. Date: Jun. 30, 2022

(65) Prior Publication Data
US 2022/0405993 A1    Dec. 22, 2022

(51) Int. Cl.
*G06T 11/20*    (2006.01)
*G06F 16/26*    (2019.01)
*G06F 3/0482*   (2013.01)

(52) U.S. Cl.
CPC ............ *G06T 11/206* (2013.01); *G06F 16/26* (2019.01); *G06F 3/0482* (2013.01); *G06T 2200/24* (2013.01)

(58) Field of Classification Search
CPC . G06T 11/206; G06T 2200/24; G06F 3/0482; G06F 16/26
See application file for complete search history.

(56) References Cited

U.S. PATENT DOCUMENTS

2012/0218254 A1    8/2012    Abeln
2013/0167015 A1    6/2013    Hadley et al.
(Continued)

FOREIGN PATENT DOCUMENTS

CN    102708126 A    10/2012
CN    103177069 A    6/2013
(Continued)

*Primary Examiner* — Michelle L Sams
(74) *Attorney, Agent, or Firm* — IP & T GROUP LLP

(57) ABSTRACT

A data processing device includes visualization component (s) of an option group and at least one chart component. The option group includes a first option and a second option. The at least one chart component has a subscription relationship with the first option of the option group. The at least one chart component is configured to display first chart(s) belonging to the at least one chart component in response to operation of selecting the first option. The at least one chart component has a subscription relationship with the second option of the option group. The at least one chart component is further configured to display second chart(s) belonging to the at least one chart component in response to operation of selecting the second option.

15 Claims, 33 Drawing Sheets

(56) References Cited

U.S. PATENT DOCUMENTS

2013/0293553 A1 11/2013 Burr et al.
2015/0281144 A1 10/2015 Staerk et al.

FOREIGN PATENT DOCUMENTS

| CN | 106164950 | A | 11/2016 | |
|----|-----------|---|---------|---|
| CN | 107491427 | A | 12/2017 | |
| CN | 109359154 | A | 2/2019 | |
| CN | 110531976 | A | 12/2019 | |
| CN | 111522565 | A | 8/2020 | |
| CN | 111966761 | A | 11/2020 | |
| WO | WO-2020132537 A1 * | | 6/2020 | ......... G06F 16/2462 |

* cited by examiner

300

300

(A)

(B)

Option 1

Name: Person and vehicle

Corresponding value: menu1

Icon address: ****

Click or drag the picture to upload here

Option 2

Name: Comprehensive security

Corresponding value: menu2

Icon address: ****

Click or drag the picture to upload here

Option 3

Name: Work order task

Corresponding value: menu3

Icon address: ****

Click or drag the picture to upload here

Option 4

Name: Alarm management

Corresponding value: menu4

Icon address: ****

Click or drag the picture to upload here

DATA PROCESSING DEVICE AND METHOD, ELECTRONIC APPARATUS FOR DATA VISUALIZATION

CROSS-REFERENCE TO RELATED APPLICATION

This application is a national phase entry under 35 USC 371 of International Patent Application No. PCT/CN2020/139721, filed on Dec. 26, 2020, which is incorporated herein by reference in its entirety.

TECHNICAL FIELD

The present disclosure relates to the field of display technologies, and in particular, to a data processing device and method, an electronic apparatus.

BACKGROUND

When most companies or enterprises summarize or report in stages, complex data is processed into transparent specification. The use of data visualization may make a large amount of data easy to explain and understand.

SUMMARY

In one aspect, a data processing device is provided. The data processing device includes at least one visualization component of an option group and at least one chart component. The option group includes a first option and a second option. The at least one chart component has a subscription relationship with the first option of the option group, and the at least one chart component is configured to display at least one first chart belonging to the at least one chart component in response to operation of selecting the first option. The at least one chart component has a subscription relationship with the second option of the option group, and the at least one chart component is further configured to display at least one second chart belonging to the at least one chart component in response to operation of selecting the second option.

In some embodiments, the at least one visualization component of the option group is configured to publish a first event corresponding to the first option and a second event corresponding to the second option. Each chart component is configured to monitor an event published by the at least one visualization component of the option group. The at least one chart component is configured to display the at least one first chart in response to the first event, and display the at least one second chart in response to the second event.

In some embodiments, the at least one visualization component of the option group includes one visualization component, or the at least one visualization component of the option group includes a plurality of visualization components. The plurality of visualization components include a first visualization component and a second visualization component. The first visualization component is configured to publish the first event corresponding to the first option, and the second visualization component is configured to publish the second event corresponding to the second option.

The at least one chart component includes one chart component, or the at least one chart component includes a plurality of chart components. The plurality of chart components include a first chart component and a second chart component. The first chart component is configured to display the at least one first chart in response to the first event, and the second chart component is configured to display the at least one second chart in response to the second event.

In some embodiments, the at least one chart component includes a first chart component and a second chart component. The first chart component is configured to set a corresponding item in the first chart component as the first option, so that the first chart component has a subscription relationship with the first option. The second chart component is configured to set a corresponding item in the second chart component as the second option, so that the second chart component has a subscription relationship with the second option.

In some embodiments, the at least one visualization component of the option group includes first data items and second data items corresponding to the first data items. The first data items are configured to distinguish the first option from the second option. The at least one chart component includes one chart component, and the chart component includes at least two third data items. The chart component is configured to map at least one third data item in the chart component to a second data item corresponding to the first option so that the chart component has a subscription relationship with the first option, and map at least one third data item in the chart component to a second data item corresponding to the second option so that the chart component has a subscription relationship with the second option.

In some embodiments, the at least one visualization component of the option group is further configured to obtain a data source, and bind a first variable in the data source to the second data item corresponding to the first option or the second option. The chart component is configured to bind the at least one third data item in the chart component to a second variable, so as to map the at least one third data item to the second data item corresponding to the first option or the second option.

In some embodiments, the data source includes a dynamic data source and a static data source.

In some embodiments, the chart component is configured to bind the at least one third data item in the chart component to a placeholder written in the second data item corresponding to the first option or the second option, so as to map the at least one third data item to the second data item corresponding to the first option or the second option.

In some embodiments, the at least one chart component is further configured to update at least one of a first chart and a second chart every preset time.

In some embodiments, the option group is a drop-down menu. The first option and the second option are drop-down options of the drop-down menu.

In some embodiments, the option group is a title menu. The first option and the second option are title options of the title menu.

In some embodiments, the option group is a chart. The first option and the second option are chart fields of the chart.

In another aspect, a data processing method is provided. The data processing method includes: displaying a first interface including an option group, the option group including a first option and a second option, the first option being in a selected state and the second option being in an unselected state on the first interface, and the first interface further including at least one first chart corresponding to the first option; and displaying a second interface including the option group in response to operation of selecting the second option in the option group on the first interface, the first option being in an unselected state and the second option being in a selected state on the second interface, the second interface further including at least one second chart corresponding to the second option.

In some embodiments, before displaying the first interface including the option group, the data processing method further includes: setting a corresponding relationship between the first option and a first chart, and a corresponding relationship between the second option and a second chart.

In some embodiments, setting the corresponding relationship between the first option and the first chart, and the corresponding relationship between the second option and the second chart includes: setting a corresponding item of the first chart as the first option; and setting a corresponding item of the second chart as the second option.

In some embodiments, setting the corresponding relationship between the first option and the first chart, and the corresponding relationship between the second option and the second chart includes: setting a corresponding item of the first chart as the first option in response to first operation on the third interface; and setting a corresponding item of the second chart as the second option in response to second operation on the third interface.

In some embodiments, the data processing method further includes: displaying a third interface, the third interface including the first chart or an associated chart of the first chart, and the second chart or an associated chart of the second chart, the associated chart of the first chart and the first chart belonging to a first chart component, and the associated chart of the second chart and the second chart belonging to a second chart component.

Setting the corresponding relationship between the first option and the first chart, and the corresponding relationship between the second option and the second chart includes: receiving operation of selecting the first chart or the associated chart of the first chart on the third interface, and setting a corresponding item in the first chart component as the first option; and receiving operation of selecting the second chart or the associated chart of the second chart on the third interface, and setting a corresponding item in the second chart component as the second option.

In some embodiments, setting the corresponding relationship between the first option and the first chart, and the corresponding relationship between the second option and the second chart includes: configuring data items of the option group, the data items of the option group including first data items and second data items corresponding to the first data items, and the first data items being configured to distinguish the first option from the second option; creating a third chart including at least two third data items; and mapping at least one third data item in the third chart to a second data item, in a case where the at least one third data item in the third chart is mapped to a second data item corresponding to the first option, the third chart being the first chart, and in a case where the at least one third data item in the third chart is mapped to a second data item corresponding to the second option, the third chart being the second chart.

In some embodiments, setting the corresponding relationship between the first option and the first chart, and the corresponding relationship between the second option and the second chart includes: configuring at least one visualization component of the option group, the at least one visualization component including first data items and second data items corresponding to the first data items, and the first data items being configured to distinguish the first option from the second option; and configuring a chart component including at least two third data items, so as to map at least one third data item in the chart component to a second data item; in a case where the at least one third data item in the chart component is mapped to a second data item corresponding to the first option, a displayed chart being the first chart, and in a case where the at least one third data item in the chart component is mapped to a second data item corresponding to the second option, the displayed chart being the second chart.

In some embodiments, setting the corresponding relationship between the first option and the first chart, and the corresponding relationship between the second option and the second chart includes: displaying a fourth interface including the option group in an initial state; receiving operation of selecting the option group in the initial state on the fourth interface, and operation of configuring at least one visualization component of the option group, the at least one visualization component including first data items and second data items corresponding to the first data items, and the first data items being configured to distinguish the first option from the second option; displaying a fifth interface including a third chart; and configuring a chart component including at least two third data items to which the third chart belongs, so as to map at least one third data item in the chart component to a second data item; in a case where the at least one third data item in the chart component is mapped to a second data item corresponding to the first option, a displayed chart being the first chart, and in a case where the at least one third data item in the chart component is mapped to a second data item corresponding to the second option, the displayed chart being the second chart.

In some embodiments, mapping the at least one third data item in the chart component to the second data item includes: binding a first variable in a data source corresponding to the second data item to a second variable; and binding the at least one third data item in the chart component to the second variable.

In some embodiments, binding the first variable in the data source corresponding to the second data item to the second variable includes: receiving the second variable input by a user in a binding input box of the second data item, so that the first variable in the data source corresponding to the second data item is bound to the second variable input in the binding input box.

In some embodiments, before binding the first variable in the data source corresponding to the second data item to the second variable, the data processing method further includes: turning on a publishing event switch item corresponding to the second data item of a visualization component.

In some embodiments, mapping the at least one third data item in the chart component to the second data item includes: turning on a publishing event switch item corresponding to the second data item of a visualization component; binding the at least one third data item in the chart component to a placeholder written in the second data item; and turning on a receiving event switch item of the chart component, so that the at least one third data item in the chart component is mapped to the second data item.

In some embodiments, the data processing method further includes: setting an update time of at least one of a first chart and a second chart as a preset time, so that the at least one of the first chart and the second chart is updated every preset time.

In yet another aspect, a data processing device is provided. The data processing device includes a memory and a processor. The memory stores one or more computer programs. The processor is coupled to the memory. The processor is configured to execute the one or more computer programs, so that the data processing device implements the data processing method as described in any one of the above embodiments.

In yet another aspect, an electronic apparatus is provided. The electronic apparatus includes the data processing device as described in any one of the above embodiments and a display device. The display device is configured to display interfaces.

In yet another aspect, a non-transitory computer-readable storage medium is provided. The computer-readable storage medium stores computer program instructions that, when run on a processor, cause a computer to implement the data processing method as described in any one of the above embodiments.

In yet another aspect, a computer program product is provided. The computer program product includes computer program instructions that, when run on a computer, cause the computer to perform the data processing method as described in any one of the above embodiments.

In yet another aspect, a computer program is provided. When executed on a computer, the computer program causes the computer to perform the data processing method as described in any one of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, and are not limitations on actual sizes of products, actual processes of methods and actual timings of signals involved in the embodiments of the present disclosure.

FIGS. 11A to 11D are schematic diagrams of interfaces of a data processing method, in accordance with some embodiments;

DETAILED DESCRIPTION

Figure 1A:
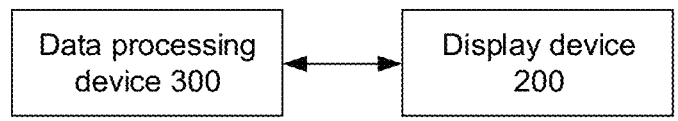
FIG. 1A is a diagram showing a structure of an electronic apparatus, in accordance with some embodiments.

Technical solutions in some embodiments of the present disclosure will be described clearly and completely below with reference to accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are used for descriptive purposes only, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the terms "coupled" and "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

As used herein, depending on the context, the term "if" is optionally construed as "when" or "in a case where" or "in response to determining" or "in response to detecting". Similarly, depending on the context, the phrase "if it is determined . . . " or "if [a stated condition or event] is detected" is optionally construed as "in a case where it is determined . . . " or "in response to determining . . . " or "in a case where [the stated condition or event] is detected" or "in response to detecting [the stated condition or event]".

The use of the phrase "applicable to" or "configured to" herein means an open and inclusive expression, which does not exclude devices that are applicable to or configured to perform additional tasks or steps.

In the related art, in a process of data visualization, there is a need to create a chart corresponding to each scene or menu, and configure attributes of the chart and data corresponding to each scene or menu, so as to present corresponding data content on each scene or menu. However, in a process of switching between scenes or menus, it is usually to display created chart(s) corresponding to a scene or a menu; if data corresponding to a scene or a menu changes, corresponding chart(s) need to be recreated. The created chart does not change as the data corresponding the scene or the menu changes; therefore, communication or interaction between a type or data of the chart and the scene or the menu cannot be achieved, resulting in a complicated process of data visualization and a poor effect.

Figure 1B:
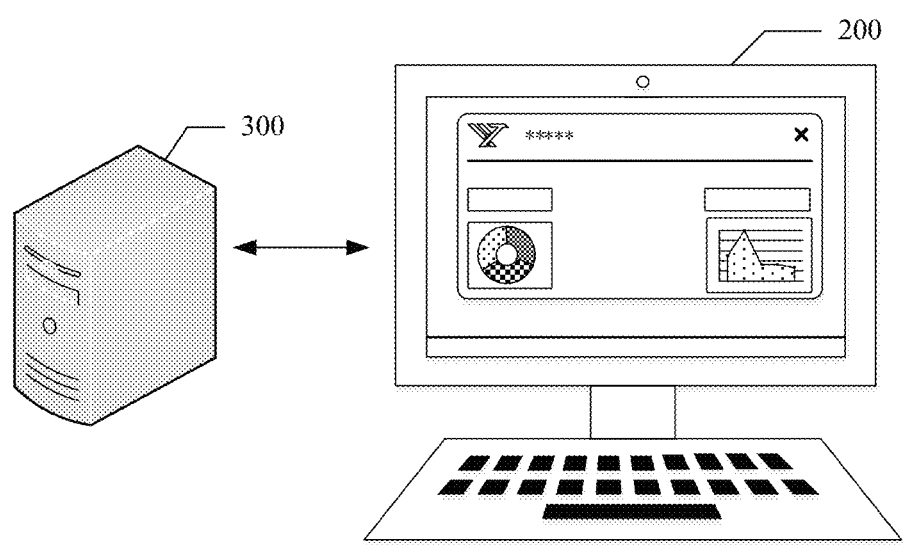
FIG. 1B is a diagram showing a structure of another electronic apparatus, in accordance with some embodiments.

Embodiments of the present disclosure provide an electronic apparatus. For example, the electronic apparatus may be a computer. As shown in FIGS. 1A and 1B, the electronic apparatus 100 includes a data processing device 300 and a display device 200. The display device 200 is coupled to the data processing device 300. For example, the display device 200 may be communicatively connected to the data processing device 300. For example, the data processing device 300 may control an image displayed on the display device 200, i.e., content displayed on an interface of the display device 200.

For example, the display device may be connected to the data processing device through a wireless communication manner (e.g., Wi-Fi, bluetooth, or the like). For example, the data processing device is connected to a wireless access point (AP) through a wireless communication manner or a wired communication manner, and the display device is connected to the wireless AP through a wireless communication manner, so as to be communicatively connected to the data processing device. Of course, the embodiments are not limited to this communication connection manner. For example, the data processing device may be connected to the display device through a wired communication manner.

In some embodiments, the display device is configured to display an image. For example, the display device may display a processing result of the data processing device. For example, the display device may be a display, or a product including a display, such as a television, a computer (all-in-one machine or desktop), a tablet computer, a mobile phone or an electronic picture screen. For example, the display device may be any device that displays an image whether in motion (e.g., a video) or fixed (e.g., a static image), and regardless of text or image. More specifically, it is contemplated that the described embodiments may be implemented in or associated with a variety of electronic apparatuses. The variety of electronic apparatuses include (but not limited to), for example, game consoles, television monitors, flat-panel displays, computer monitors, automotive displays (such as odometer displays), navigators, cockpit controllers and/or displays, electronic photos, electronic billboards or signages, projectors, building structures, packaging, and aesthetic structures (such as a displays for an image of a piece of jewelry).

For example, the display device described herein may include one or more displays, or one or more terminals with a display function. Therefore, the data processing device may send processed data (for example, influence parameters) to the display device, and then the display device displays the processed data.

The display device is configured to display interfaces. For example, the interfaces include interfaces described herein, such as a first interface and a second interface. For example, the display device may display a result obtained by the data processing device after processing data.

Embodiments of the present disclosure provide a data processing device, and the data processing device may be configured to implement a data processing method described in any of the following embodiments. For example, the data processing device may include: a personal computer, a portable electronic device, a cloud server, or any other electronic device with a computing function.

Figure 2A:
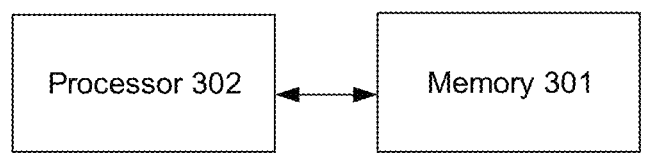
FIGS. 2A to 2D are diagrams showing structures of data processing devices, in accordance with some embodiments.

In some embodiments, as shown in FIG. 2A, the data processing device 300 includes a memory 301 and a processor 302. The memory 301 is coupled to the processor 302. For example, the processor is coupled to the memory through, for example, an input/output (I/O) interface, thereby achieving information interaction.

The memory 301 stores one or more computer programs that may be run on the processor 302.

The computer program(s), when executed by the processor 302, cause the data processing device 300 to implement the data processing method described in any of the following embodiments.

For example, the processor 302 may be one processor, or a general term of a plurality of processing elements. For example, the processor 302 may be a general-purpose central processing unit (CPU), a microprocessor, or an application specific integrated circuit (ASIC); or the processor 302 may include one or more integrated circuits used to control execution of programs of the solutions of the embodiments of the present disclosure (such as one or more microprocessors). For another example, the processor 302 may be a programmable device. For example, the programmable device is a complex programmable logic device (CPLD), an erasable programmable logic device (EPLD) or a field-programmable gate array (FPGA).

The memory 301 may be one memory or a general term of a plurality of storage elements, and is used to store executable program codes. Moreover, the memory 301 may include a random access memory or a non-volatile memory, such as a disk memory, or a flash memory.

The memory 301 is used to store application program codes for implementing the solutions of the embodiments of the present disclosure, and the processor 320 controls the application program codes to be executed. The processor 302 is used to execute the application program codes stored in the memory 301, so that the data processing device 300 implements the data processing method provided in any one of the following embodiments of the present disclosure.

Figure 3:
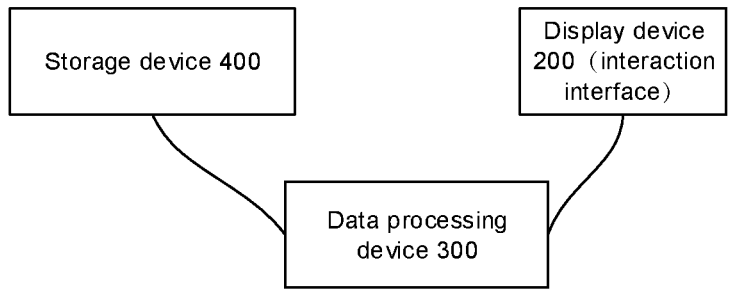
FIG. 3 is a diagram showing a structure of yet another electronic apparatus, in accordance with some embodiments.

In some embodiments, as shown in FIG. 3, the electronic apparatus further includes a storage device 400. The storage device 400 is configured to store data. For example, the data stored in the storage device includes a data source. The data processing device may obtain the data source in the storage device, and control the display device to display data in the data source on the interface according to the data source.

For example, the storage device 400 is coupled to the data processing device 300. For example, the storage device may be connected to the data processing device through a wireless communication manner. For example, the storage device is connected to a wireless AP through a wireless communication manner or a wired communication manner, and the data processing device is connected to the wireless AP through a wireless communication manner, so as to be communicatively connected to the storage device. Of course, the embodiments are not limited to this communication connection manner. For example, the data processing device and the storage device may be connected through a wired communication manner.

Figure 2B:
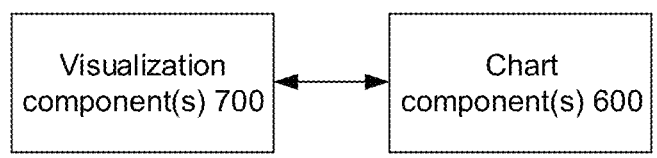

Embodiments of the present disclosure provide a data processing device, as shown in FIG. 2B, the data processing device includes visualization component(s) 700 of an option group and at least one chart component 600. The option group includes a first option and a second option. The at least one chart component has a subscription relationship with the first option of the option group, and the at least one chart component is configured to display first chart(s) belonging to the at least one chart component in response to operation of selecting the first option. The at least one chart component has a subscription relationship with the second option of the option group, and the at least one chart component is further configured to display second chart(s) belonging to the at least one chart component in response to operation of selecting the second option. For example, the operation of selecting the first option or the second option may be an operation that a user selects the first option or the second option on the interface. For example, if the user clicks the first option on the interface, the first option is selected, and the second option is not selected. If the user clicks the second option on the interface, the second option is selected, and the first option is not selected.

For example, a component is an independent and reusable individual instance, and essence of the component is to encapsulate static, dynamic or a series of logic. For example, the component may include attribute information of the component and be configured to achieve a preset function. The attribute information may include access objects of data of the component, for example, attributes such as width and height. The preset function may include a function that may be achieved by the component. In specific programming, the preset function may be achieved in a form of a function. The component may be used as an encapsulation body of the data of the component and the function that may be achieved by the component. The component can reuse hardware, and exchange data with other components. For example, the chart component may be a chart component in ECharts or other chart libraries. For example, the visualization component(s) of the option group may make options in the option group be displayed, so as to visualize the option group. For example, the component may include a computer program that achieves the preset function. For another example, the component may include hardware, such as a processor, that executes the computer program that achieves the preset function.

For example, the first chart and the second chart may belong to a same chart component. For example, chart types, attribute information or corresponding data sources of the first chart and the second chart are the same, but data thereof used in rendering is different. Alternatively, the first chart and the second chart belong to different chart components. For example, chart types of the first chart and the second chart are different, but attribute information, corresponding data sources, or data used in rendering of the first chart and the second chart are the same; or chart types of the first chart and the second chart are the same, but attribute information, corresponding data sources, or data used in rendering of the first chart and the second chart are different; or chart types of the first chart and the second chart are different, and attribute information, corresponding data sources, or data used in rendering of the first chart and the second chart are different.

The visualization component(s) of the option group may have a subscription relationship with the at least one chart component. That is, the visualization component(s) of the option group may communicate with the at least one chart component. For example, the visualization component(s) of the option group may communicate with the at least one chart component through a publish/subscribe model. For example, the publish/subscribe model includes: an event bus, or $attrs and $listeners, or provide and inject, vuex, or the like. For example, the visualization component of the option group publishes an event, and the at least one chart component monitors the event. In response to the event published by the visualization component of the option group having information contained in the event published by the visualization component of the option group, the at least one chart component performs corresponding operation, e.g., displaying chart(s) belonging to the at least one chart component. The chart is related to the information contained in the event published by the visualization component.

In this case, a component (i.e., a component for publishing an event) sends data corresponding to the component to other component(s) (i.e., component(s) for receiving the event) through a communication manner (e.g., an event bus), so as to achieve interaction or communication between the component and the component(s) (e.g., one-to-one or one-to-many). For example, when a component changes, other component(s) take corresponding action in response to an event value transmitted through the communication manner (e.g., the event bus). For example, when data corresponding to the visualization component of the option group changes, the chart component re-renders the chart in response to the data transmitted through the event bus, so as to obtain an updated chart.

Figure 4:
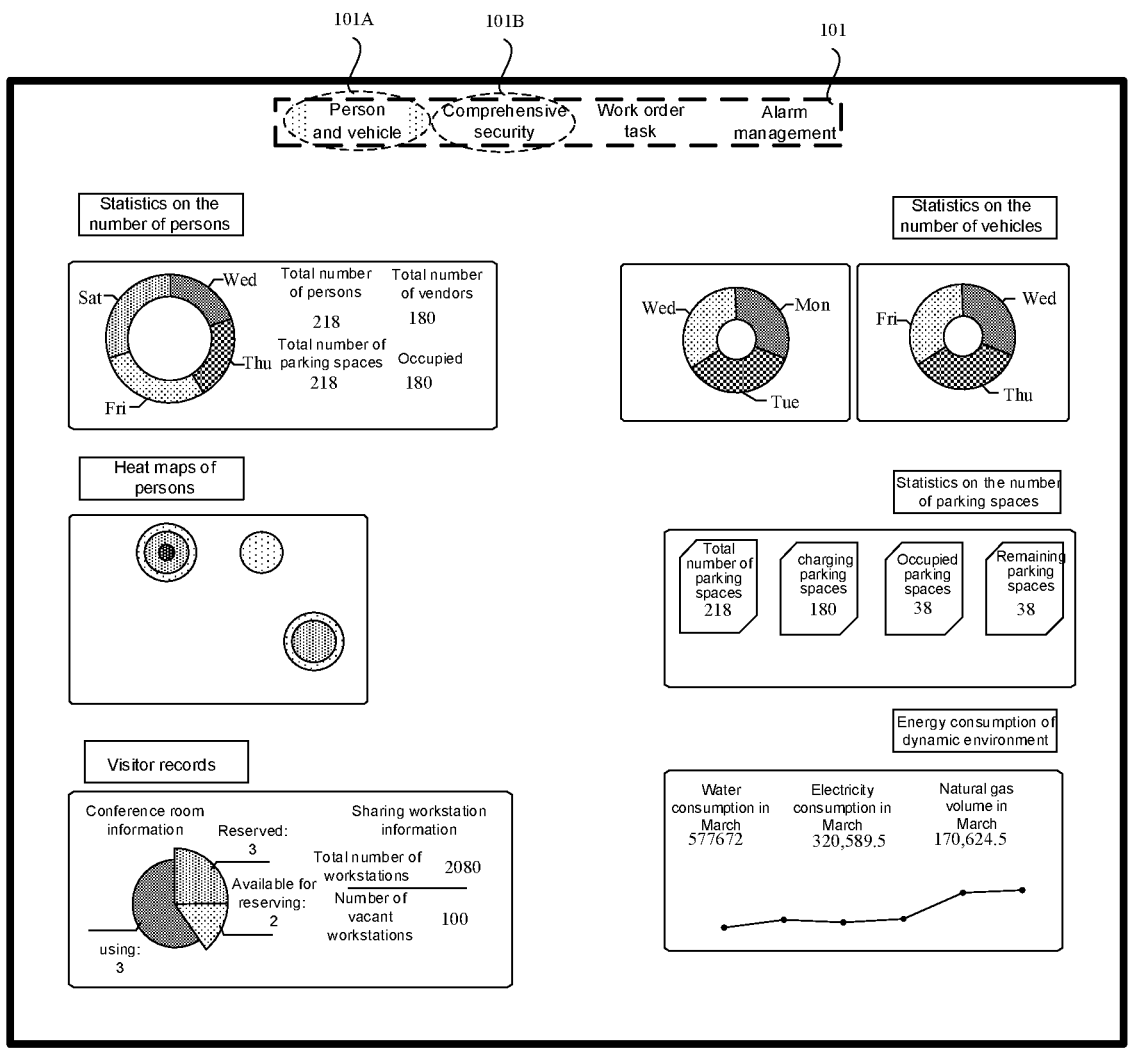
FIG. 4 is a schematic diagram of an interface of a data processing method, in accordance with some embodiments.
Figure 5:
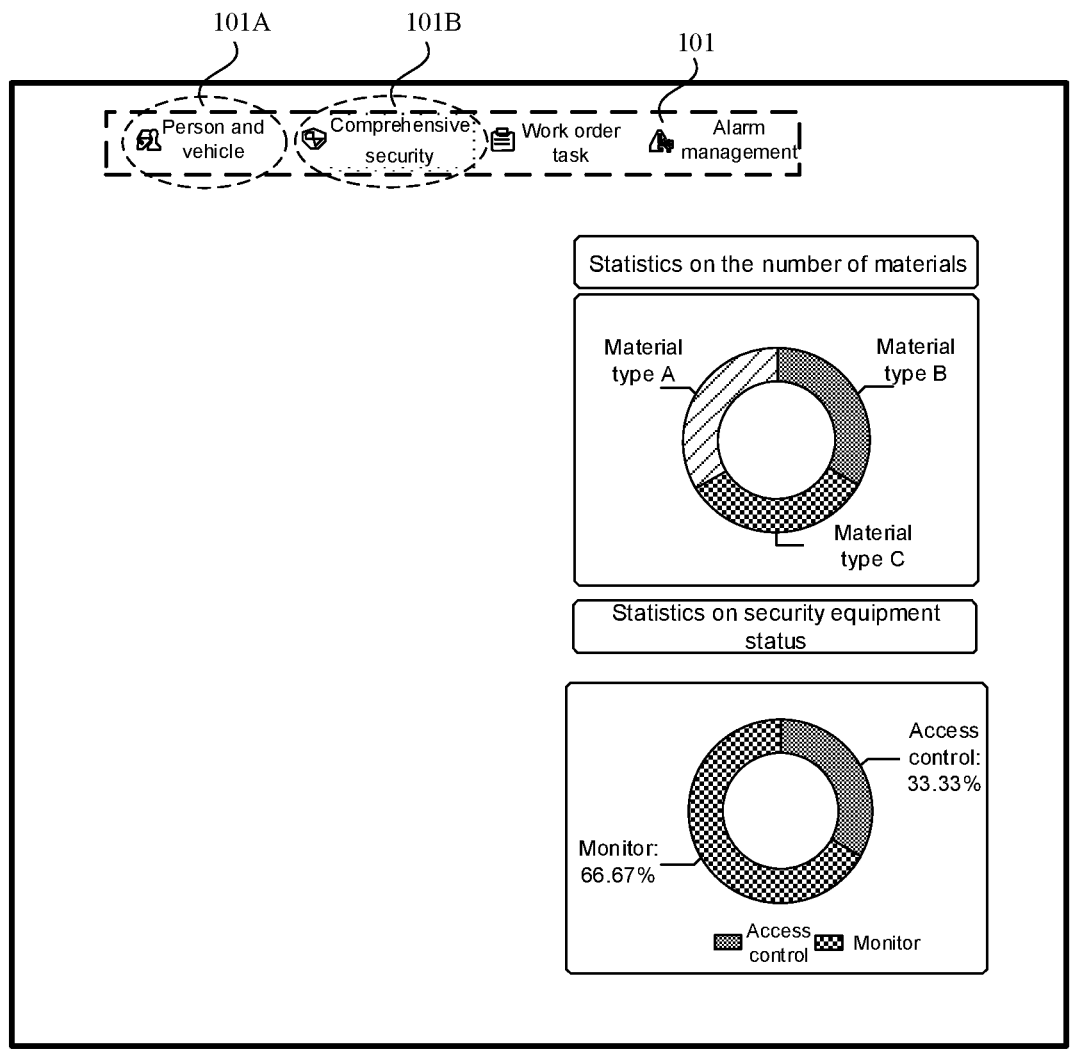
FIG. 5 is a schematic diagram of another interface of a data processing method, in accordance with some embodiments.

For example, the option group may be a title menu. The first option and the second option are title options of the title menu. For example, the title menu may be presented in a form of a title bar on the interface. For example, referring to FIG. 4, in a case where the option group 101 is the title menu on the first interface F1, the title options include person and vehicle, comprehensive security, work order task, and alarm management. For example, as shown in FIG. 4, the person and vehicle in the title options has a subscription relationship with the at least one chart component. The first option is the person and vehicle. The first chart(s) belonging to the at least one chart component may include charts for characterizing results of data statistics on the number of persons, the number of vehicles, visitor records, parking spaces, heat maps of persons, and energy consumption of dynamic environment. The at least one chart component may display these charts (for example, displaying these charts on the first interface F1). For example, referring to FIG. 5, the comprehensive security in the title options on the second interface F2 has a subscription relationship with the at least one chart component. The second option is the comprehensive security. The second chart(s) belonging to the at least one chart component may include charts for characterizing results of data statistics on the number of materials, or security equipment status. The at least one chart component may display these charts (for example, displaying these charts on the second interface F2). It will be understood that, referring to FIGS. 4 and 5, the first option 101A is the person and vehicle, and the second option 101B is the comprehensive security. The person and vehicle is selected on the first interface, and a chart, which has no subscription relationship with the person and vehicle, in the chart component(s) is not displayed. For example, the second chart, which has a subscription relationship with the comprehensive security (i.e., the second option), in the at least one chart component is not displayed. That is, the first interface F1 presents the first chart, but does not present the second chart. In this case, the user may visually view data related to the person and vehicle. The comprehensive security is selected on the second interface F2, and a chart, which has no subscription relationship with the comprehensive security, in the chart component(s) is not displayed. For example, the first chart, which has a subscription relationship with the person and vehicle (i.e., the first option), in the at least one chart component is not displayed. That is, the second interface F2 presents the second chart, but does not present the first chart. In this case, the user may visually view data related to the comprehensive security.

The option group may include a plurality of options. One of two options of the plurality of options is used as the first option, and the other of the two options is used as the second option. The first option and the second option may be switched. For example, the person and vehicle may be regarded as the second option, and the comprehensive security may be regarded as the first option.

Figure 6:
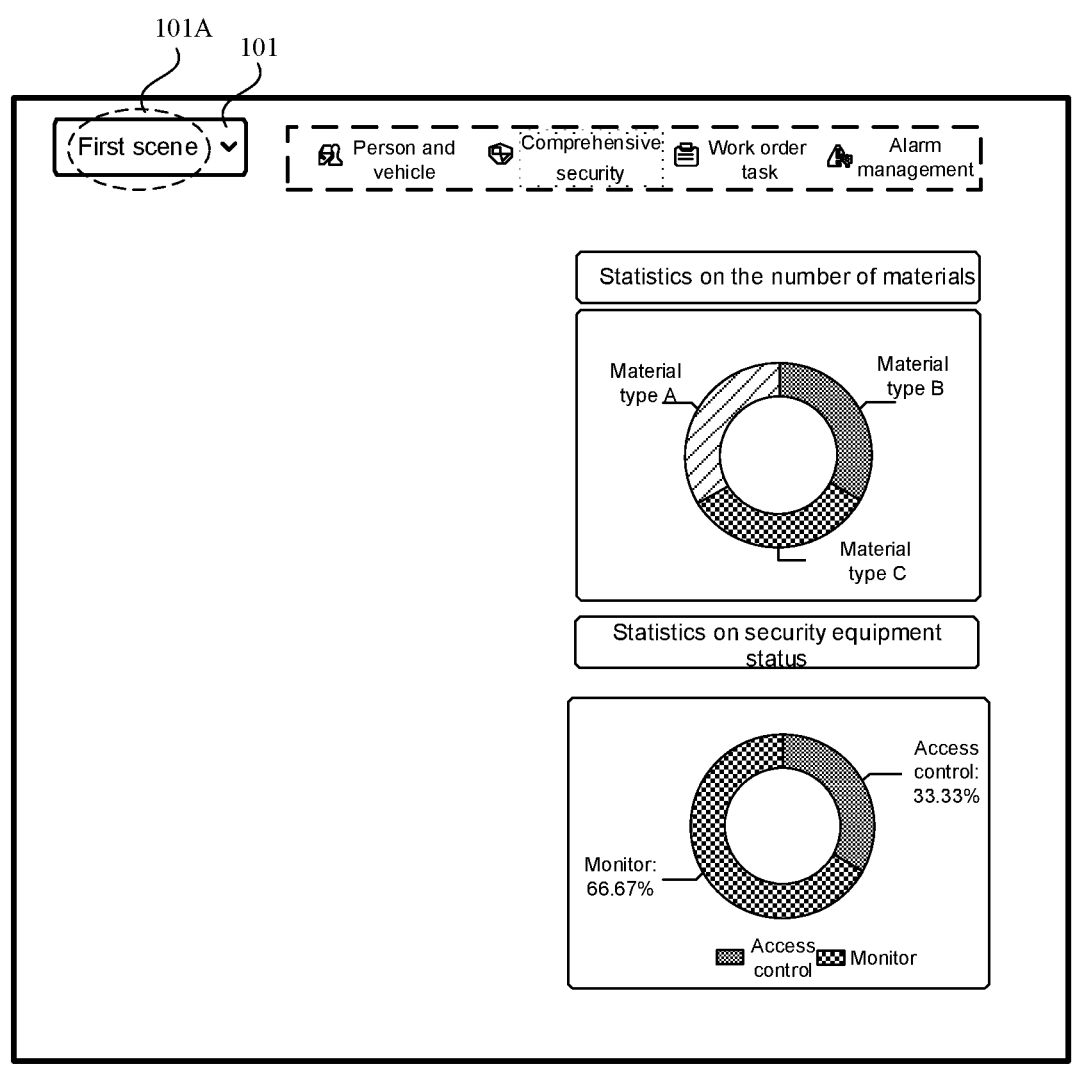
FIG. 6 is a schematic diagram of yet another interface of a data processing method, in accordance with some embodiments.
Figure 7:
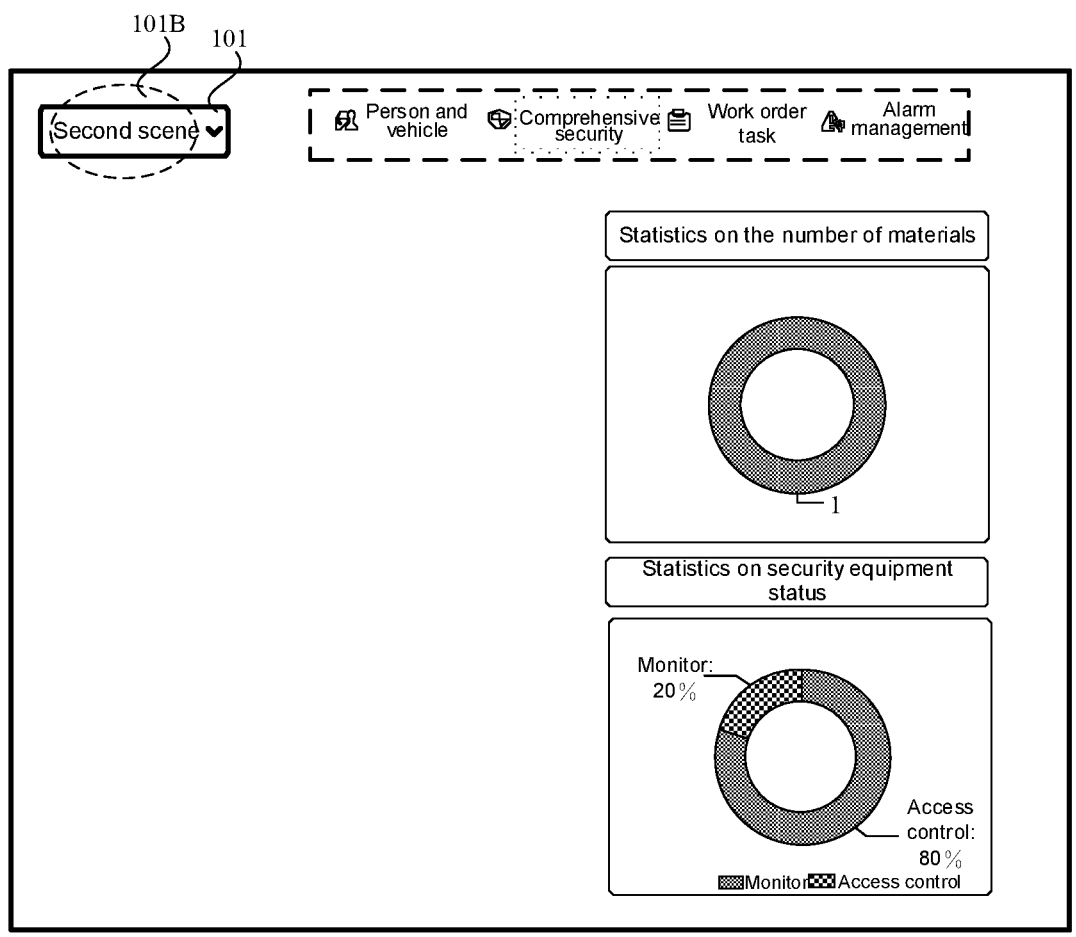
FIG. 7 is a schematic diagram of yet another interface of a data processing to method, in accordance with some embodiments.

For example, the option group is a drop-down menu. The first option and the second option are drop-down options of the drop-down menu. For example, the drop-down menu may be presented in a form of a drop-down box on the interface. For example, referring to FIGS. 6 and 7, in a case where the option group 101 is the drop-down menu, the drop-down options include a first scene and a second scene. The first option 101A is the first scene, and the second option 101B is the second scene. In this case, the first scene is selected on the first interface F1 in FIG. 6, and the first chart, which has a subscription relationship with the first scene, in the at least one chart component is displayed on the first interface F1 in FIG. 6. A chart, which has no subscription relationship with the first scene, in the at least one chart component is not displayed. For example, the second chart, which has a subscription relationship with the second scene, in the at least one chart component is not displayed. That is, the first interface presents the first chart, but does not present the second chart. In this case, the user may visually view data related to the first scene. The second scene is selected on the second interface F1 in FIG. 7. The second chart, which has the subscription relationship with the second scene, in the at least one chart component is displayed on the second interface F2 in FIG. 7. A chart, which has no subscription relationship with the second scene, in the at least one chart component is not displayed. For example, the first chart, which has the subscription relationship with the first scene, in the at least one chart component is not displayed. That is, the second interface presents the second chart, but does not present the first chart. In this case, the user may visually view data related to the second scene. In the case where the option group is the drop-down menu, types of charts corresponding to different drop-down options may be the same, but data content represented by the charts may be different. For example, the first chart and the second chart may be a same type of charts. In a case where the data related to the first scene is different from the data related to the second scene, data represented by the first chart is different from data represented by the second chart. For example, referring to FIGS. 6 and 7, the first chart and the second chart are both ring charts, but data of the first chart in FIG. 6 is different from data of the second chart in FIG. 7.

For example, the option group is a chart. The first option and the second option are chart fields of the chart. For example, the chart includes a first chart field and a second chart field. The first option is the first chart field, and the second option is the second chart field. The first chart field and the second chart field may be different chart fields or a same chart field. For example, in a case where the option group is a pie chart, chart fields correspond to parts (i.e., fan-shaped parts) of the pie chart. For example, referring to FIG. 10, the first chart field of the pie chart corresponding to the first option corresponds to part A of the pie chart. The second chart field of the pie chart corresponding to the second option corresponds to part B of the pie chart. Part A of the pie chart is selected on the first interface, and the first chart, which has a subscription relationship with part A of the pie chart, in the at least one chart component is displayed. A chart, which has no subscription relationship with part A of the pie chart, in the at least one chart component is not displayed. For example, the second chart, which has a subscription relationship with part B of the pie chart, in the at least one chart component is not displayed. That is, the first interface presents the first chart, but does not present the second chart. In this case, the user may visually view data related to part A of the pie chart. Part B of the pie chart is selected on the second interface, and the second chart, which has the subscription relationship with part B of the pie chart, in the at least one chart component is displayed. A chart, which has no subscription relationship with part B of the pie chart, in the at least one chart component is not displayed. For example, the first chart, which has the subscription relationship with part A of the pie chart, in the at least one chart component is not displayed. That is, the second interface presents the second chart, but does not present the first chart. In this case, the user may visually view data related to part B of the pie chart. For example, referring to FIG. 10, the option group is the pie chart. The first chart field corresponds to part A of the pie chart. That is, the first option is part A of the pie chart. The second chart field corresponds to part B of the pie chart. That is, the second option is part B of the pie chart. As shown in part (A) of FIG. 10, part A of the pie chart has a subscription relationship with the at least one chart component, and the first chart is displayed correspondingly. The first chart is a line chart. Referring to part (B) of FIG. 10, part B of the pie chart has a subscription relationship with the at least one chart component, and the second chart is displayed correspondingly. The second chart is also a line chart, and data corresponding to the second chart is different from data corresponding to the first chart. The first chart and the second chart may be a same type of charts or different types of charts, and the data represented by the first chart and the data represented by the second chart may be different or same, which may be designed according to actual conditions, and not limited here.

For example, the at least one chart component may have subscription relationships with a plurality of visualization components. For example, the at least one chart component may have subscription relationships with the visualization components of the title menu and the drop-down menu. For example, referring to FIGS. 8 and 9, for a drop-down option (e.g., the first scene) in the drop-down menu, title options of the title menu are used as the first option 101A and the second option 101B of the option group 101. For example, the person and vehicle is used as the first option 101A, and the alarm management is used as the second option 101B. In this way, the first interface F1 may present the first chart corresponding to the person and vehicle and the first scene, and the second interface F2 may present the second chart corresponding to the alarm management and the first scene. For example, referring to FIGS. 6 and 7, for a title option (e.g., the comprehensive security) of the title menu, drop-down options of the drop-down menu are used as the first option 101A and the second option 101B of the option group 101. For example, the first scene is used as the first option 101A, and the second scene is used as the second option 101B. In this way, the first interface F1 may present the first chart corresponding to the first scene and the comprehensive security, and the second interface F2 may present the second chart corresponding to the second scene and the comprehensive security.

Therefore, in the data processing device provided in the embodiments of the present disclosure, the at least one chart component has the subscription relationship with the first option of the option group, and the at least one chart component is configured to display the first chart(s) belonging to the at least one chart component in response to the operation of selecting the first option; the at least one chart component has the subscription relationship with the second option of the option group, and the at least one chart component is further configured to display the second chart(s) belonging to the at least one chart component in response to the operation of selecting the second option. In this way, the first option is associated with the first chart(s) in the at least one chart component that has the subscription relationship with the first option, and the second option is associated with the second chart(s) in the at least one chart component that has the subscription relationship with the second option. If the first option changes, the first chart(s) in the at least one chart component that has the subscription relationship with the first option may change with the change of the first option. If the second option changes, the second chart(s) in the at least one chart component that has the subscription relationship with the second option may change with the change of the first option. The switching between the first chart and the second chart may be achieved by switching the first option and the second option, so that interaction between the first chart and the first option is achieved, and interaction between the second chart and the second option is achieved. As a result, an effect of data visualization may be improved.

In some embodiments, the visualization component(s) of the option group are configured to publish a first event corresponding to the first option and a second event corresponding to the second option. Each chart component is configured to monitor events (i.e., the first event and the second event) published by the visualization component(s) of the option group. The at least one chart component is configured to display the first chart in response to the first event, and display the second chart in response to the second event.

It will be understood that, in a case where the visualization component of the option group publishes the first event corresponding to the first option, all the chart components monitor the first event, but the at least one chart component that has the subscription relationship with the first option causes the visualization component to interact with the at least one chart component in response to the first event. For example, the visualization component and the at least one chart component may transmit parameter information related to the first option through the event bus. The at least one chart component may perform corresponding operation according to the parameter information related to the first option, so that the first chart in the at least one chart component is displayed (e.g., the first chart is displayed on the first interface). Since chart component(s) that have no subscription relationship with the first option do not respond to the first event, the first interface does not present chart(s) in the chart component(s) that have no subscription relationship with the first option. Correspondingly, in a case where the visualization component of the option group publishes the second event corresponding to the second option, all the chart components monitor the second event, but at least one chart component that has the subscription relationship with the second option causes the visualization component to interact with the at least one chart component in response to the second event. For example, the visualization component and the at least one chart component may transmit parameter information related to the second option through the event bus. The at least one chart component may perform corresponding operation according to the parameter information related to the second option, so that the second chart in the at least one chart component is displayed (e.g., the second chart is displayed on the second interface). Since chart component(s) that have no subscription relationship with the second option do not respond to the second event, the second interface does not present chart(s) in the chart component(s) that have no subscription relationship with the second option.

For example, the visualization component(s) of the option group include one visualization component. For example, the first option and the second option belong to the same visualization component. For example, both attribute information and corresponding data sources of the first option and the second option are same, but data content represented by the first option and the second option is different.

Figure 2C:
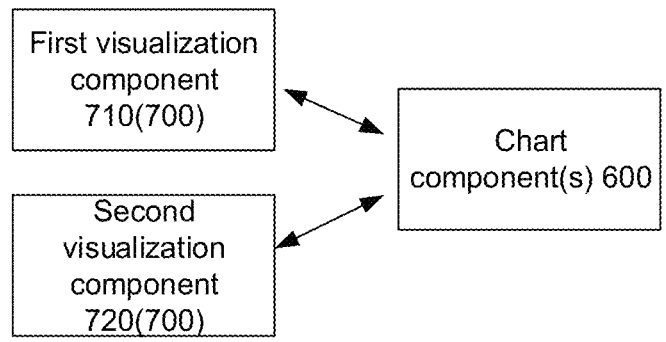

For example, the visualization component(s) of the option group include a plurality of visualization components. Referring to FIG. 2C, the plurality of visualization components 700 include a first visualization component 710 and a second visualization component 720. The first visualization component is configured to publish the first event corresponding to the first option. The second visualization component is configured to publish the second event corresponding to the second option. For example, the first option and the second option belong to different visualization components, and attribute information or corresponding data sources of the first option and the second option are different. The first option belongs to the first visualization component, and the second option belongs to the second visualization component. In this case, at least one chart component has a subscription relationship with the first visualization component, and at least one chart component has a subscription relationship with the second visualization component. In this way, interaction between the at least one chart component and the first visualization component is achieved, and interaction between the at least one chart component and the second visualization component is achieved.

For example, the at least one chart component includes one chart component. For example, the first chart and the second chart may belong to the same chart component. For example, chart types, attribute information, or corresponding data sources of the first chart and the second chart are same, but data of the first chart and the second chart used in rendering is different.

Figure 2D:
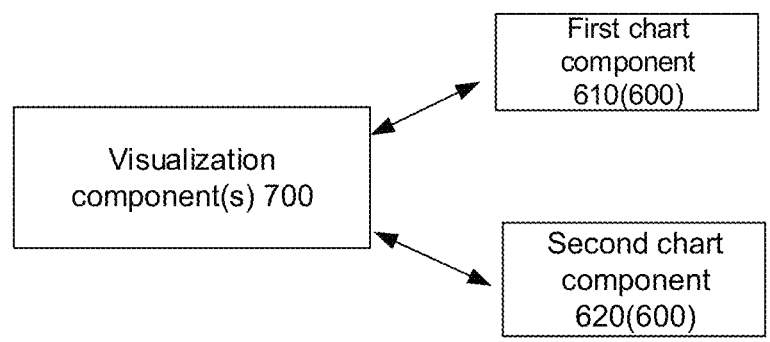

For example, the at least one chart component includes a plurality of chart components. Referring to FIG. 2D, the plurality of chart components 600 include a first chart component 610 and a second chart component 620. The first chart component is configured to display the first chart in response to the first event. The second chart component is configured to display the second chart in respond to the second event. In this case, the first chart component has a subscription relationship with the visualization component of the option group. The second chart component has a subscription relationship with the visualization component of the option group. In this way, interaction between the first chart component and the visualization component of the option group is achieved, and interaction between the second chart component and the visualization component of the option group is achieved. For example, in the case where the visualization component(s) of the option group include the plurality of visualization components, and the plurality of visualization components include the first visualization component and the second visualization component, the first chart component has a subscription relationship with the first visualization component, and the second chart component has a subscription relationship with the second visualization component. In this way, interaction between the first chart component and the first visualization component is achieved, and interaction between the second chart component and the second visualization component is achieved.

In some embodiments, the at least one chart component includes the first chart component and the second chart component; the first chart component is configured to set a corresponding item in the first chart component as the first option, so that the first chart component has a subscription relationship with the first option; and the second chart component is configured to set a corresponding item in the second chart component as the second option, so that the second chart component has a subscription relationship with the second option.

Figure 13A:
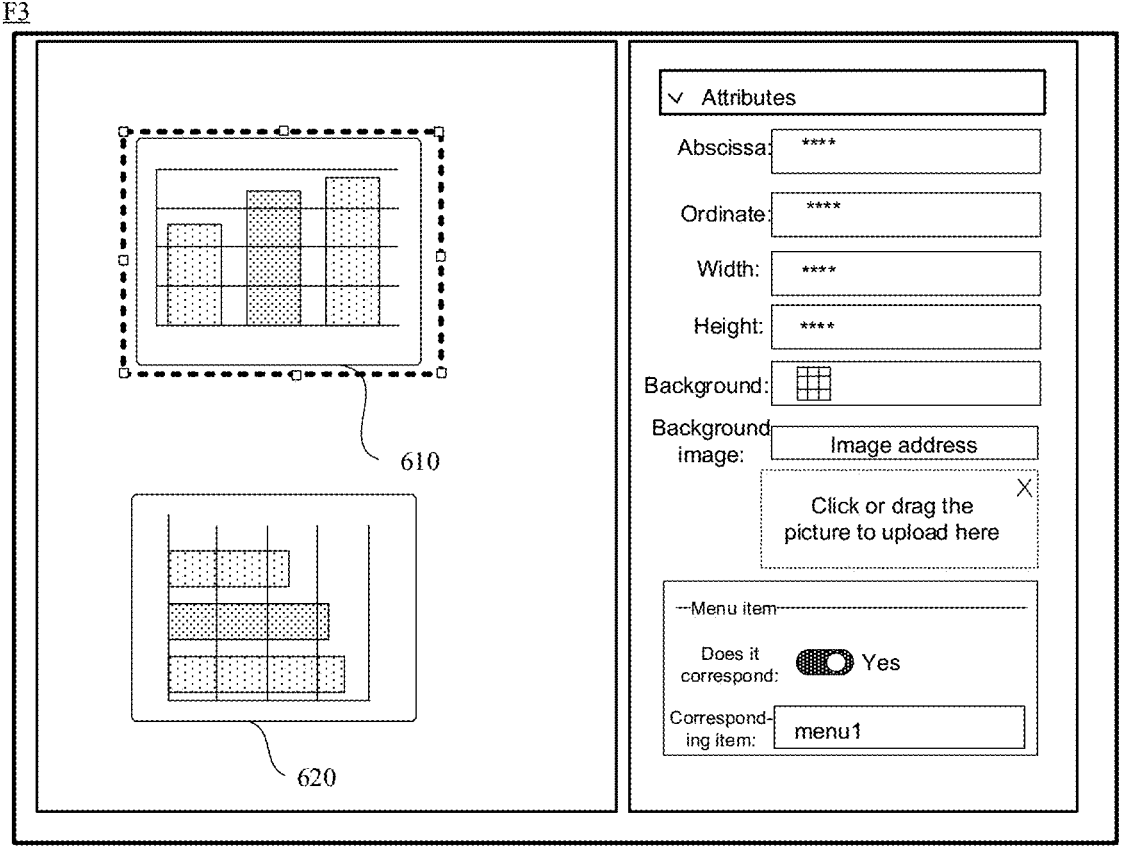
FIGS. 13A to 13C are schematic diagrams of interfaces of a data processing method, in accordance with some embodiments.
Figure 13B:
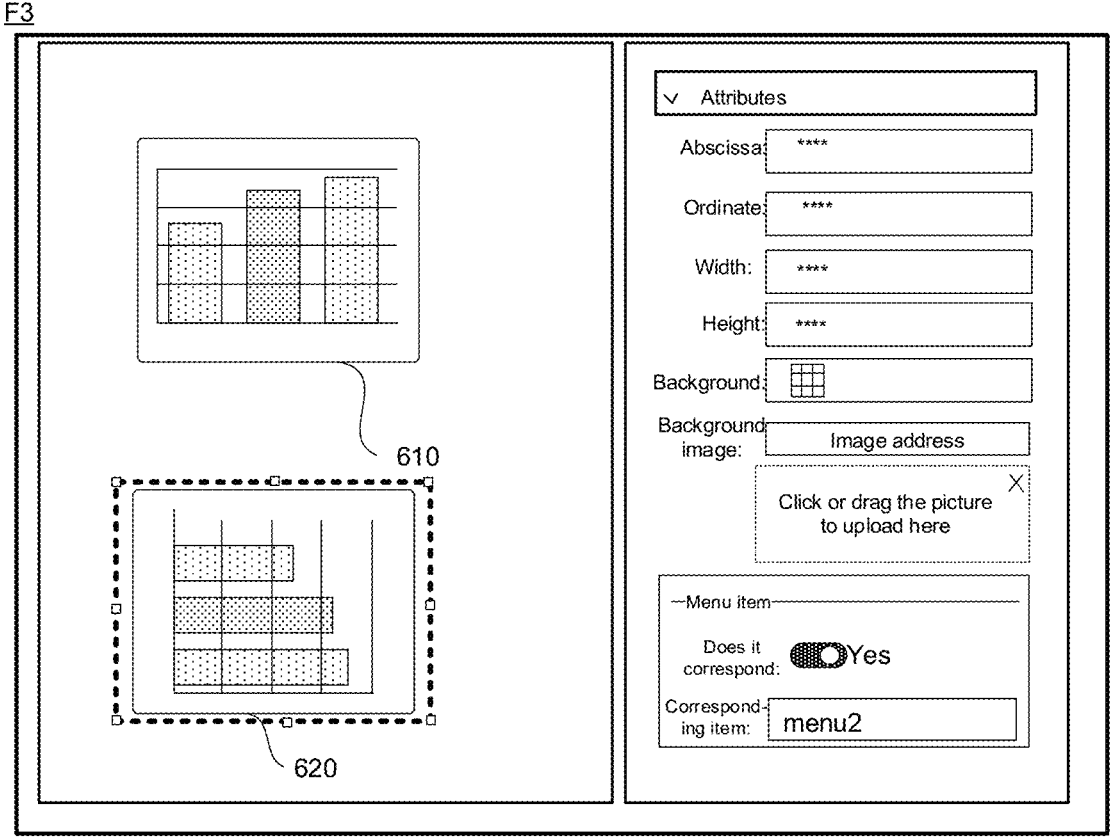
Figure 13C:
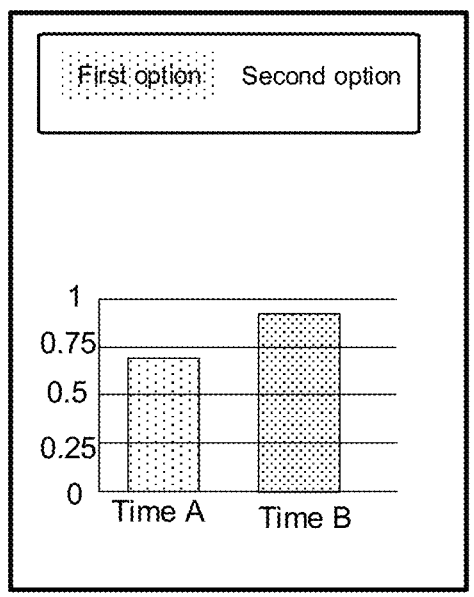
Figure 13C:
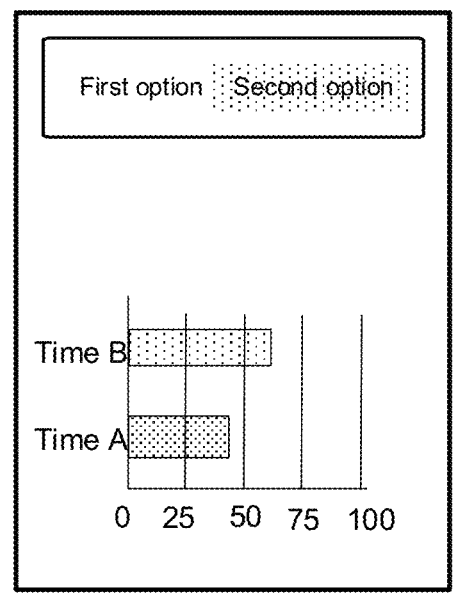

For example, referring to FIG. 13A, the corresponding item in the first chart component 610 is set as the first option, for example, set as a corresponding value menu1 of the first option, so that the first option has the subscription relationship with the first chart component. In this way, the first chart belonging to the first chart component may be associated with the first option. Referring to FIG. 13C, in a case where the visualization component publishes the first event corresponding to the first option, the first chart component may make the first chart to be displayed. Referring to FIG. 13B, the corresponding item in the second chart component 620 is set as the second option, for example, set as a corresponding value menu2 of the second option, so that the second option has the subscription relationship with the second chart component. In this way, the second chart belonging to the second chart component may be associated with the second option. Referring to FIG. 13C, in a case where the visualization component publishes the second event corresponding to the second option, the second chart component may make the second chart to be displayed. For example, the corresponding value of the first option may be a name or creation order of the first option, and the corresponding value of the second option may be a name or creation order of the second option. For example, if the first option is created before the second option, the corresponding value of the first option may be menu1, and the corresponding value of the second option may be menu2. In this way, a corresponding item of the first chart may be set to menu1, and a corresponding item of the second chart may be set to menu2. Therefore, the first chart is associated with the first option, and the second chart is associated with the second option.

In some embodiments, the visualization component(s) of the option group include first data items and second data items corresponding to the first data items. The first data items are configured to distinguish the first option from the second option.

Figure 14A:
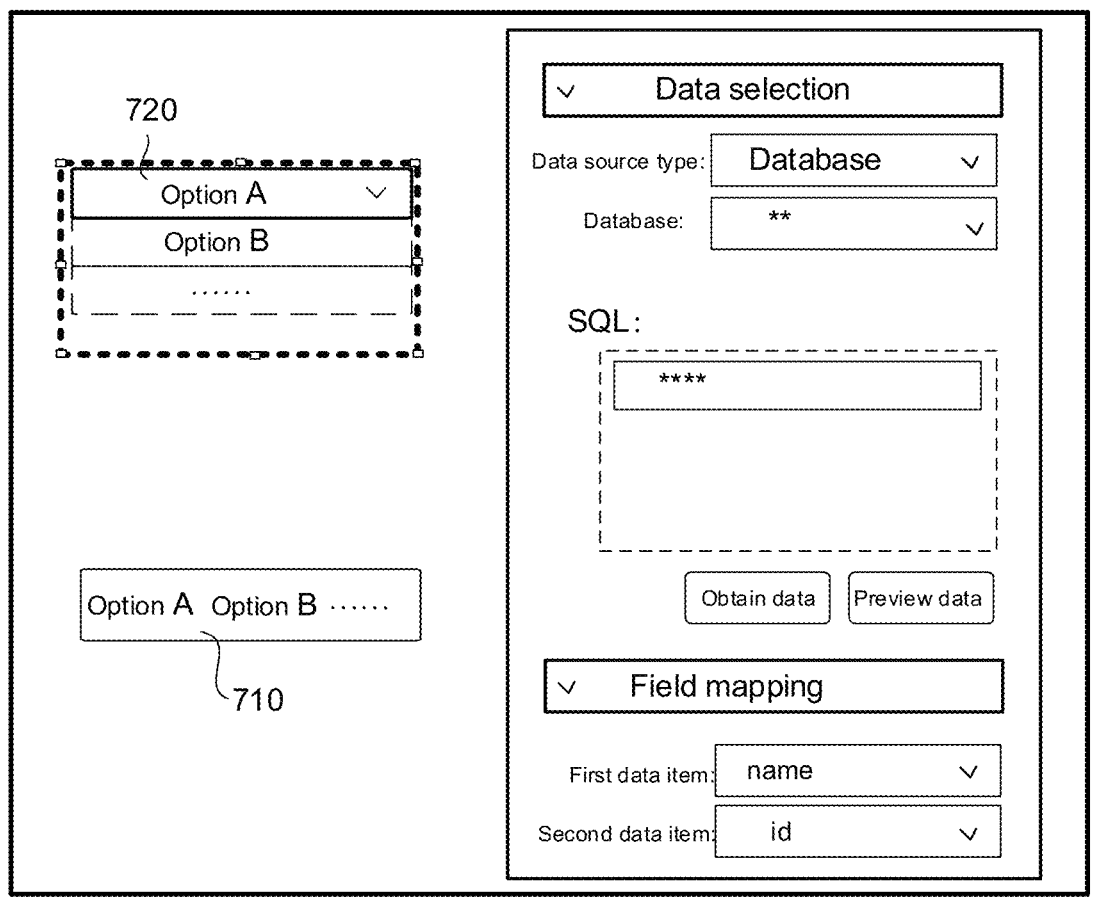
FIGS. 14A to 14D are schematic diagrams of interfaces of a data processing method, in accordance with some embodiments.
Figure 14B:
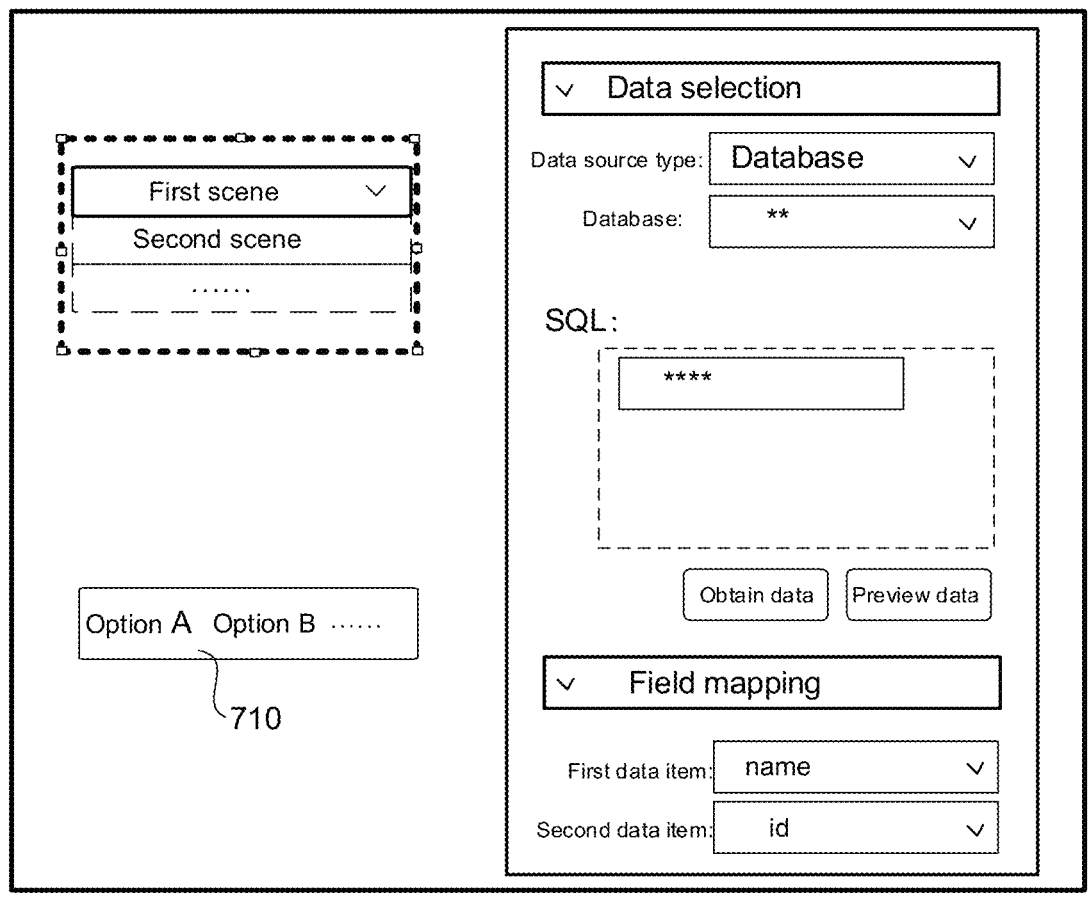

For example, referring to FIGS. 14A and 14B, the first data items in the visualization component(s) of the option group are bound to a variable name. In this case, option A of the option group is displayed as the first scene, and option B of the option group is displayed as the second scene. The second data items are bound to a variable id. Data corresponding to option A (i.e., the first option) is data of the variable id when the variable name is the first scene. Data corresponding to option B (i.e., the second option) is data of the variable id when the variable name is the second scene. For example, the first data items in the option group may be used to identify the option group. For example, the first data items in the option group are displayed on the interface, and the second data items are not displayed on the interface. Content of first data items of different options in the option group is different. For example, in a case where the option group is the drop-down menu, the first data item of the first option may be the first scene, and the first data item of the second option may be the second scene. For example, in a case where the option group is the title menu, the first data item of the first option may be the person and vehicle, and the first data item of the second option may be the comprehensive security. For example, in a case where the option group is the chart, the first data item corresponding to the first option may be the first chart field of the chart, and the first chart field represents a first category. The first data item corresponding to the second option may be a second chart field of the chart, and the second chart field represents a second category.

The at least one chart component includes one chart component. The chart component includes at least two third data items. The chart component is configured to: map at least one third data item in the chart component to the second data item corresponding to the first option, so that the chart component has a subscription relationship with the first option; and map at least one third data item in the chart component to the second data item corresponding to the second option, so that the chart component has a subscription relationship with the second option.

It will be understood that, at least one third data item in the chart component is mapped to the second data item corresponding to the first option, so that the chart component is associated with the first option; data corresponding to the second data item corresponding to the first option may be transmitted to the at least one third data item in the chart component, and according to the received data corresponding to the second data item corresponding to the first option, the chart component may obtain the first chart through rendering, and display the first chart. In this case, data corresponding to the first chart is related to the data corresponding to the second data item corresponding to the first option. At least one third data item in the chart component is mapped to the second data item corresponding to the second option, so that the chart component is associated with the second option; data corresponding to the second data item corresponding to the second option may be transmitted to the at least one third data item in the chart component, and according to the received data corresponding to the second data item corresponding to the second option, the chart component may obtain the second chart through rendering, and display the second chart. In this case, data corresponding to the second chart is related to the data corresponding to the second data item corresponding to the second option. Based on the above, if the data corresponding to the second data item corresponding to the first option changes, the data corresponding to the first chart also changes accordingly; therefore, the interaction between the first option and the first chart is achieved. If the data corresponding to the second data item corresponding to the second option changes, the data corresponding to the second chart also changes accordingly; therefore, the interaction between the second option and the second chart is achieved. In addition, in a case where the second data item corresponding to the first option or the second option changes, there is no need to recreate a chart. The first option or the second option may transmit parameter(s) to an associated chart component, and data content presented by the chart component changes accordingly. Therefore, the user may obtain the latest data.

In some embodiments, the visualization component(s) of the option group are further configured to obtain a data source, and bind a first variable in the data source to the second data item. The chart component is configured to bind at least one third data item in the chart component to a second variable, so as to map the at least one third data item to the second data item.

For example, the data source may include a dynamic data source and a static data source. Data in the dynamic data source may be changed in real time, and data in the static data source may be fixed. For example, the dynamic data source includes data obtained through application program interface (API), and data obtained by accessing a database through a programming language (e.g., structured query language (SQL)). For example, the static data source includes data of a pre-configured comma-separated values (CSV) file, and user-defined data (e.g., data manually input by the user).

It will be understood that, the second data items are bound to the first variable (the variable id shown in FIG. 14B) in the data source corresponding to the second data items, so that the data corresponding to the second data items is data represented by the first variable in the data source corresponding to the second data items. In this case, the first variable in the data source corresponding to the second data items is bound to the second variable (the variable val shown in FIG. 14D), so that the data represented by the second variable is the data represented by the first variable in the data source corresponding to the second data items. The data that is received by the at least one third data item, bound to the second variable, in the chart component is same. The data that is received by the at least one third data item, bound to the second variable, in the chart component is the data corresponding to the second variable, i.e., data represented by the first variable in the database corresponding to the second data items.

Figure 15A:
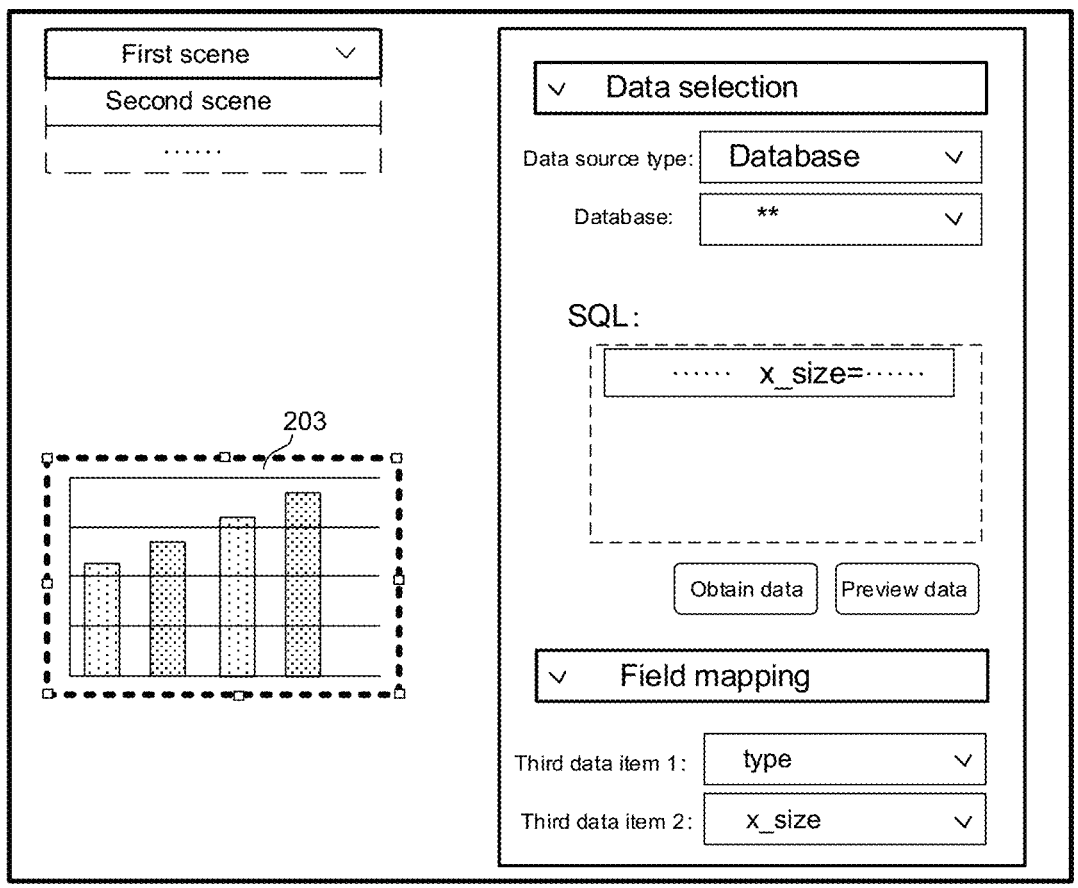
FIGS. 15A to 15C are schematic diagrams of interfaces of a data processing method, in accordance with some embodiments.

It will be understood that, in a case where the third data item(s) in the chart component are not bound to the second variable, the third data item(s) in the chart component are bound to a third variable (a variable x_size shown in FIG. 15A) in a data source corresponding to the third data item(s). In this case, the data corresponding to the third data item(s) is data represented by the third variable in the data source corresponding to the third data item(s). In a process of binding the third data item(s) in the chart component to the second variable, the third variable corresponding to the third data item(s) may be bound to the second variable. In this case, the third data item(s) are bound to the second variable, so that data corresponding to the third data item(s) is the data represented by the second variable, i.e., data represented by the first variable in the data source corresponding to the second data item. In this way, it may be achieved that the option group (i.e., the visualization component of the option group) transmits data to the chart component. In a process of switching different options of the option group, data content of the chart component is also switched accordingly.

A name of the second variable may be user-defined or pre-configured, which is to not limited here. For example, for the visualization component of the option group, the database may be used as the data source, and the data source contains the first variable. A field mapping is established between the second data items and the first variable, so that the second data items are bound to the first variable in the data source corresponding to the second data items.

For example, in a case where the database is used as the data source, data in the database may be obtained through SQL. For example, the obtained data in the database may include a plurality of variables, and the second data items may be bound to one of the plurality of variables.

For example, the first data items and the second data items in the visualization component(s) of the option group belong to a same data source. In a case where the data source corresponding to the second data items is obtained, the first data items may be bound to a variable in the data source, and the data corresponding to the first data items is data corresponding to the variable to which the first data items are bound. The variable in the data source to which the first data items are bound is related to the variable in the data source to which the second data items are bound. For example, the first data item represents a category, and the second data item represents data content (e.g., value) corresponding to the category. For example, the data source corresponding to the visualization component(s) of the option group includes two variables, i.e., name and id. The first data items may be bound to one of the two variables, and the second data items may be bound to the other of the two variables. For example, the first data items are bound to the variable name, and the second data items are bound to the variable id. In this way, the data corresponding to the first data items is data corresponding to the variable name. The data corresponding to the second data items is to data corresponding to the variable id, and the variable id is the first variable.

In addition, the data corresponding to the first data items may be displayed on the interface that displays the option group. That is, the data corresponding to the variable name may be displayed to distinguish different options in the option group. For example, in a case where the data corresponding to the variable name includes the first scene and the second scene, the data corresponding to the first data items of the option group is the first scene and the second scene, so that the first option and the second option of the option group may be distinguished. For example, the first option of the option group is the first scene, and the second option is the second scene. The number of options in the option group may be related to the data corresponding to the first data items. For example, the number of data corresponding to the first data items is related to the number of options in the option group. For example, the number of data corresponding to the first data items is equal to the number of options in the option group.

Figure 14C:
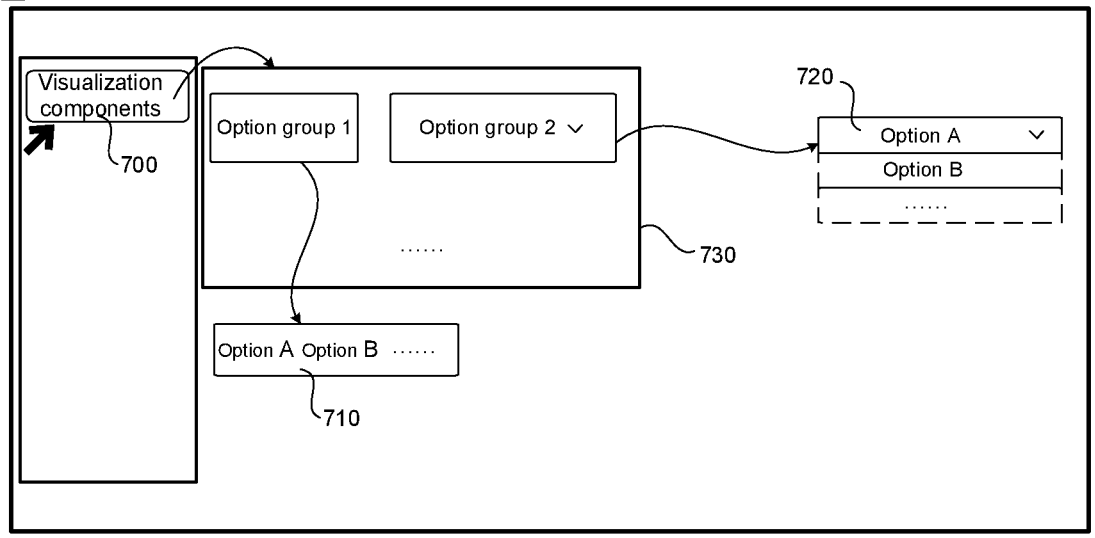
Figure 14D:
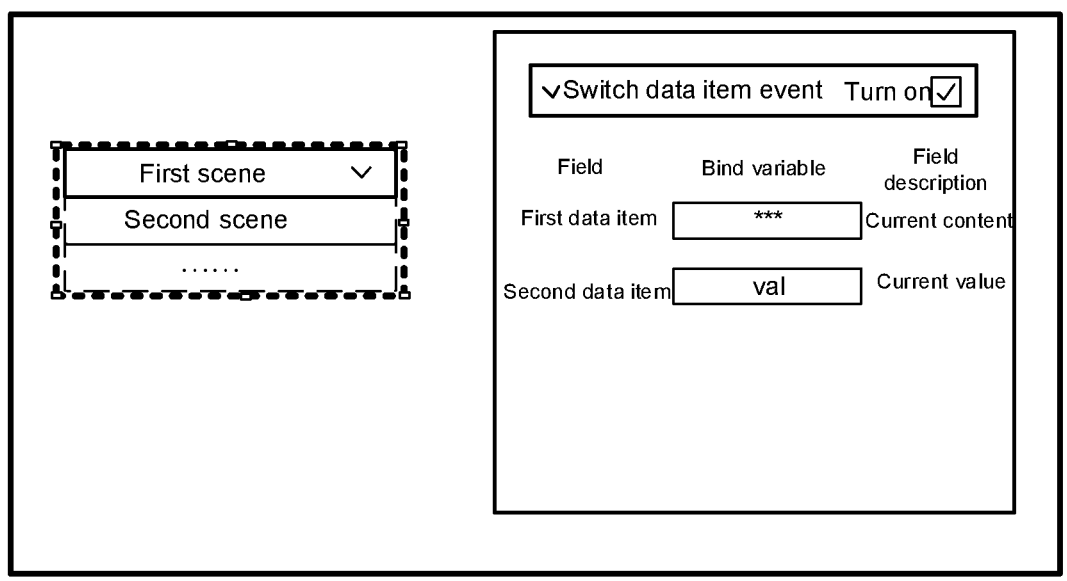
Figure 15B:
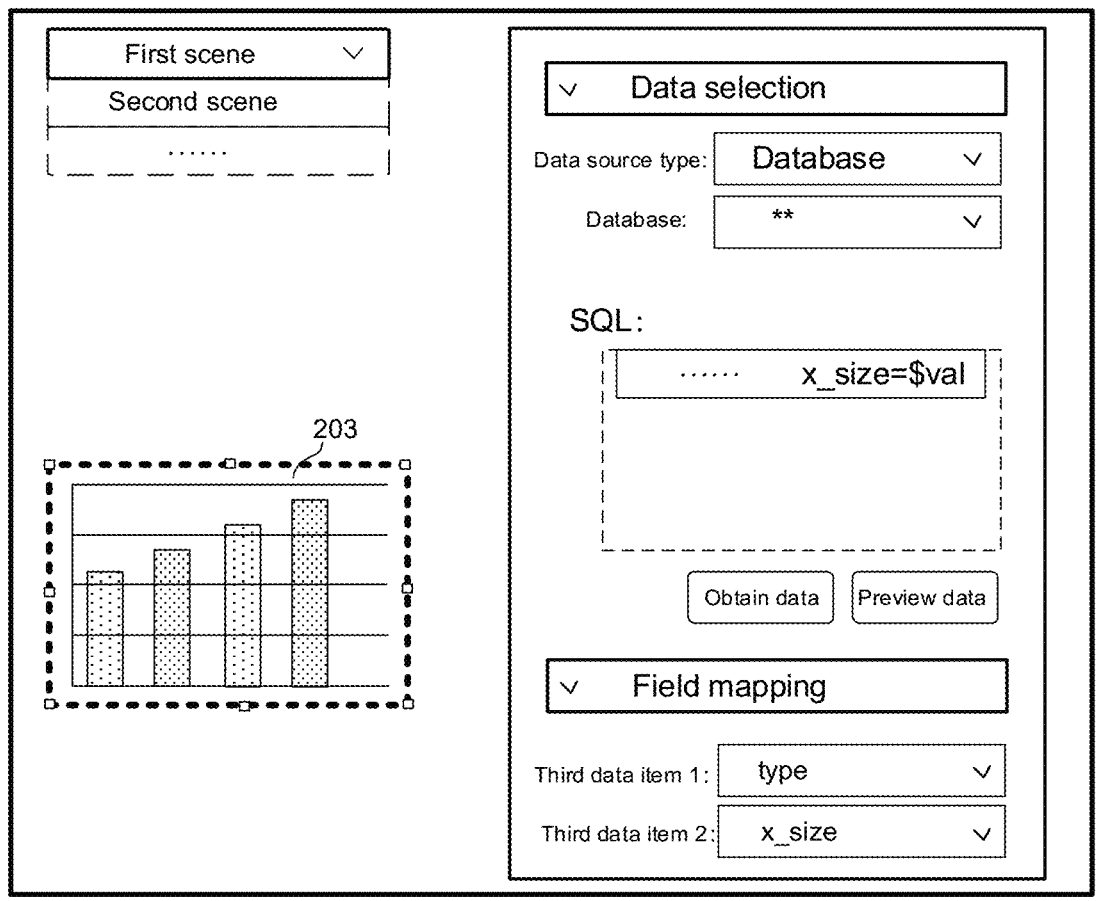

For example, the data source obtained by the chart component may be a database, and the data source includes the third variable. Afield mapping between the at least one third data item and the third variable is established. For example, a field mapping between the at least one third data item and the third variable x_size is established, so that the at least one third data item is bound to the third variable. In this case, the data corresponding to the at least one third data item is the data represented by the third variable. For example, the third data item(s) in the chart component are bound to the second variable. Referring to FIG. 14D, the second variable is defined as val. Referring to FIG. 15B, "x_size=$val" may indicate that the third data item(s) are bound to the second variable.

Figure 15C:
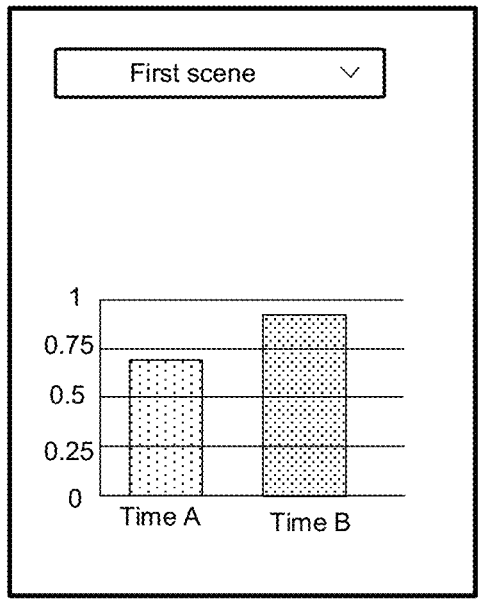
Figure 15C:
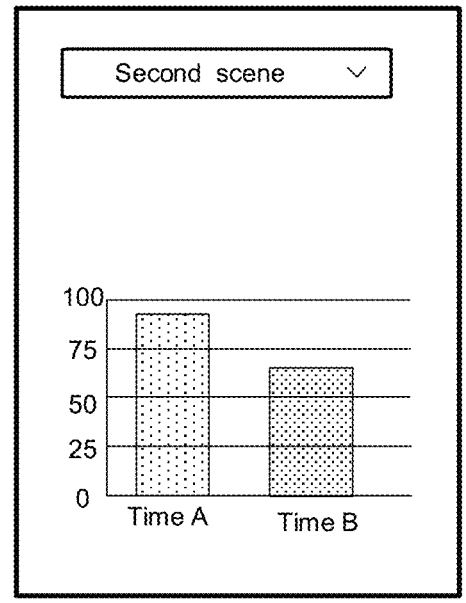

In this case, in a case where the first option in the option group is selected and the second option in the option group is not selected, the first option in the option group triggers an interactive event, and the chart component bound to the second variable may monitor the event, so that data corresponding to the at least one third data item in the chart component bound to the second variable may be the data corresponding to the second data item corresponding to the first option. In a case where the second option in the option group is selected and the first option in the option group is not selected, the second option in the option group triggers an interactive event, and the chart component bound to the second variable may monitor the event, so that the data corresponding to the at least one third data item in the chart component bound to the second variable may be the data corresponding to the second data item corresponding to the second option. In this way, when different options in the option group are switched, data corresponding to the chart component may change accordingly. For example, referring to FIG. 15C, data content of the first chart displayed based on the first option (i.e., the first scene) is different from data content of the second chart displayed based on the second option (i.e., the second scene). As a result, communication between the option group (i.e., the visualization component(s) of the option group) and the chart component may be achieved, so that real-time data switching may be achieved through parameter transmission between the option group and the chart component.

In some embodiments, the chart component is configured to bind at least one third data item in the chart component to a placeholder written in the second data item, so as to map the at least one third data item to the second data item. For example, in a case where the second data item of the visualization component is expressed as value, the placeholder written in the second data item may be expressed as ${value}. For example, the at least one third data item in the chart component is bound to the third variable in the data source corresponding to the chart component. Referring to FIG. 16B, the third variable is expressed as x_size. In this case, the binding of the at least one third data item in the chart component to the placeholder written in the second data item may be expressed as x_size=${value}. In this way, the at least one third data item may be mapped to the second data item. In this case, the visualization component communicates or interacts with the chart component. The visualization component publishes an event corresponding to the second data item, and the chart component may monitor the published event corresponding to the second data item of the visualization component. In this case, the data corresponding to the second data item may be transmitted to the at least one third data item, bound to the placeholder written in the second data item, in the chart component.

For example, data may be transmitted between different components (e.g., between the chart component and the visualization component of the option group or between chart components) through an event bus. That is, a component (i.e., a component for publishing an event) sends data corresponding to the component to other component(s) (i.e., component(s) for receiving the event) through the event bus, so as to achieve interaction or communication between the component and the component(s) (e.g., one-to-one or one-to-more). For example, when a component changes, other component(s) take corresponding action in response to an event value transmitted through the event bus. For example, when data corresponding to the visualization component of the option group changes, the chart component re-renders the chart in response to data transmitted through the event bus, so as to obtain an updated chart.

Figure 18A:
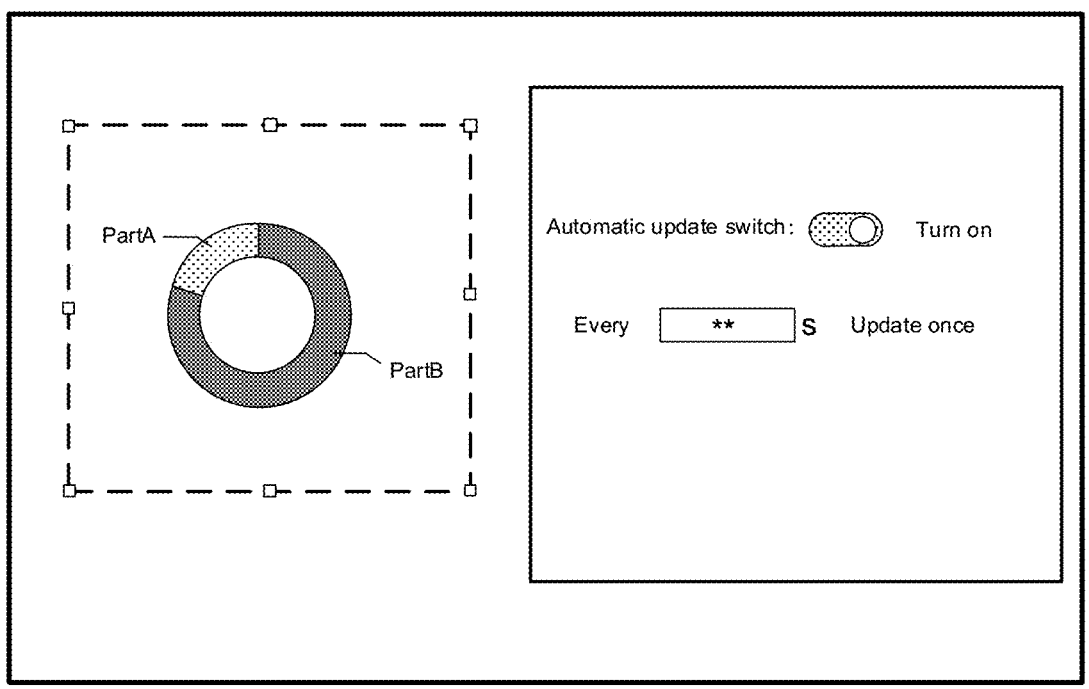
FIGS. 18A and 18B are schematic diagrams of interfaces of a data processing method, in accordance with some embodiments.
Figure 18B:
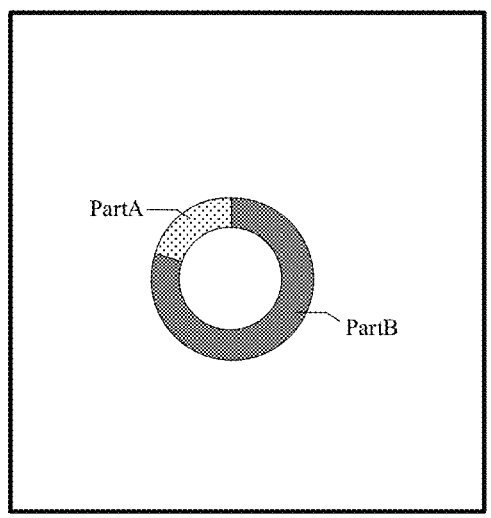
Figure 18B:
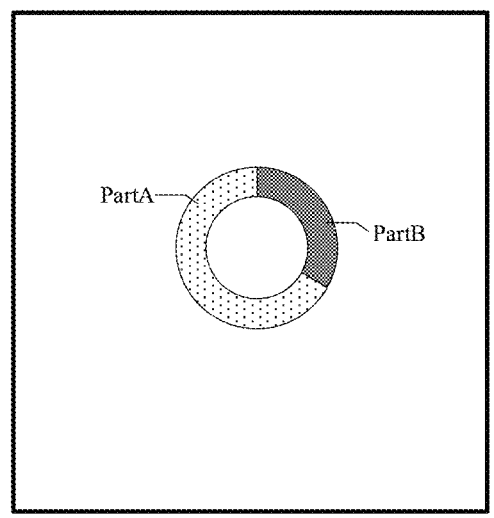

In some embodiments, the at least one chart component is further configured to update at least one of the first chart and the second chart every preset time. For example, data corresponding to at least one of the first chart and the second chart needs to be re-obtained every preset time, so that at least one third data item corresponding to a chart to be updated receives data transmitted by the second data item of the visualization component of the option group every preset time, and updates data content of the chart once. For example, the preset time may also be a refresh period. For example, when the chart in part (A) of FIG. 18B is displayed, after 3 seconds, the chart displayed in part (B) of FIG. 18B is obtained, and data content of the two charts has changed. In this way, data corresponding to at least one of the first chart and the second chart may be updated in real time, and the latest data is displayed. In addition, the preset time may be determined according to actual conditions, which is not limited here. For example, the preset time may be 3 seconds, 5 seconds, 7 seconds or the like.

Embodiments of the present disclosure provide a data processing method. The data processing method may be applied to the data processing device described above. For example, a processing result obtained by the data processing device through the data processing method may be presented in a form of 3D model on the display device. The data processing method include:

displaying a first interface including an option group, the option group including a first option and a second option, the first option being in a selected state and the second option being in an unselected state on the first interface, and the first interface further including first chart(s) corresponding to the first option; and displaying a second interface including the option group in response to operation of selecting the second option in the option group on the first interface, the first option being in an unselected state and the second option being in a selected state on the second interface, and the second interface further including second chart(s) corresponding to the second option.

For example, the chart may include a chart of a 2D model or a chart of a 3D model. For example, the chart may include line chart, bar chart, column chart, column and line chart, scatter chart, map, rectangular tree map, radar chart, pie chart, sunburst chart, heat chart, water level chart, arc column chart, or the like. For example, the chart may include basic column chart (i.e., vertical column chart), grouped column chart, stacked column chart, line and grouped column chart, or line and stacked column chart, and may further include basic line chart (i.e., single line chart), multi-line chart, or the like. For example, the chart may include a chart of a unity model. For example, the first chart and the second chart may be a same type of charts.

For example, the first option is in a selected state and the second option is in an unselected state on the first interface. In this case, the first chart(s) corresponding to the first option are displayed. The operation of selecting the second option in the option group on the first interface may be, for example, an operation of clicking display content corresponding to the second option. For example, the display content may be text or an image that is capable of characterizing the second option. In this case, the second interface is displayed, the second option is in the selected state, and the first option is in the unselected state. Therefore, the second chart(s) corresponding to the second option are displayed, and the first chart(s) corresponding to the first option are not displayed.

For example, the first option is displayed and the second option may be hidden on the first interface, and the second option is displayed and the first option may be hidden on the second interface. Alternatively, both the first option and the second option are displayed on the first interface and the second interface. For example, in a case where both the first option and the second option are displayed on the first interface and the second interface, an option in a selected state and an option in an unselected state may present different display states. Details are not limited here, as long as the option in the selected state and the option in the unselected state may be distinguished when displayed on the interface. For example, when one of the first option and the second option is selected, a displayed font of the selected option is different in size or color from a displayed font of the unselected option, or a displayed name of the selected option is different from a displayed name of the unselected option, or a displayed size of the selected option is different from a displayed size of the unselected option. In this way, the user may visually view the option in the selected state and the option in the unselected state on the interface.

For example, the option group may be a title menu. The first option and the second option are title options of the title menu. For example, the title menu may be presented in a form of a title bar on the interface. For example, referring to FIG. 4, in a case where the option group 101 is the title menu on the first interface F1, the title options include person and vehicle, comprehensive security, work order task, and alarm management. For example, as shown in FIG. 4, the person and vehicle in the title options is in the selected state. In this case, the first option is the person and vehicle, and chart(s) corresponding to the person and vehicle are displayed on the first interface F1. For example, the chart(s) corresponding to the title option of the person and vehicle may include at least one chart, i.e., at least one first chart. The at least one chart is used to characterize result(s) of data statistic(s) on the number of persons, the number of vehicles, visitor records, parking spaces, heat maps of persons, or energy consumption of dynamic environment. For example, referring to FIG. 5, the comprehensive security in the title options is in the selected state on the second interface F2. In this case, the second option is the comprehensive security, and chart(s) corresponding to the comprehensive security are displayed on the second interface F2. For example, the chart(s) corresponding to the title option of the comprehensive security may include at least one chart, i.e., at least one second chart. The at least one chart is used to characterize result(s) of data statistic(s) on the number of materials, or security equipment status. It will be understood that, referring to FIGS. 4 and 5, the first option 101A is the person and vehicle, and the second option 101B is the comprehensive security. On the first interface F1, the first option 101A is in the selected state, and the second option 101B is in the unselected state; in this case, the first chart is displayed on the first interface F1, but the second chart is not displayed on the first interface F1. As a result, the user may visually view data related to data related to the person and vehicle. On the second interface F2, the first option 101A is in the unselected state, and the second option 101B is in the selected state; in this case, the second chart is displayed on the second interface F2, but the first chart is not displayed on the second interface F2. As a result, the user may visually view data related to the comprehensive security.

The option group may include a plurality of options. One of two options in the plurality of options is used as the first option, and the other of the two options is used as the second option. The first option and the second option may be switched. For example, the person and vehicle may be regarded as the second option, and the comprehensive security may be regarded as the first option. Or, for example, referring to FIGS. 8 and 9, the person and vehicle may be regarded as the first option 101A, and the alarm management may be regarded as the second option 101B. On the first interface F1 in FIG. 8, the person and vehicle is in the selected state, and the alarm management is in the unselected state. In this case, the first chart of the result of the data statistic on the number of persons, the number of vehicles, visitor records, parking spaces, heat maps of persons, or energy consumption of dynamic environment may be obtained. On the second interface F2 in FIG. 9, the alarm management is in the selected state, and the person and vehicle is in the unselected state. In this case, the second chart of a result of a data statistic on alarm types, alarm states, the number of alarms, or alarm records may be obtained.

For example, the option group is a drop-down menu. The first option and the second option are drop-down options of the drop-down menu. For example, the drop-down menu may be presented in a form of a drop-down box on the interface. For example, referring to FIGS. 6 and 7, in a case where the option group 101 is the drop-down menu, the drop-down options include a first scene and a second scene. The first option 101A is the first scene, and the second option 101B is the second scene. On the first interface F1 in FIG. 6, the first option 101A is in the selected state, and the second option is in the unselected state (e.g., being not displayed on the first interface). The first chart is displayed on the first interface, but the second chart is not displayed on the first interface. In this case, the user may visually view data related to the first scene. On the second interface F2 in FIG. 7, the first option is in the unselected state (e.g., being not displayed on the second interface), and the second option 101B is in the selected state. The second chart is displayed on the second interface, but the first chart is not displayed on the second interface. In this case, the user may visually view data related to the second scene. In the case where the option group is the drop-down menu, types of charts corresponding to different drop-down options may be same, but data content represented by the charts may be different. For example, the first chart and the second chart may be a same type of charts. In a case where the data related to the first scene is different from the data related to the second scene, data represented by the first chart is different from data represented by the second chart. For example, referring to FIGS. 6 and 7, the first chart and the second chart are both ring charts, but data of the first chart in FIG. 6 is different from data of the second chart in FIG. 7.

For example, the option group is a chart. The first option and the second option are chart fields of the chart. For example, the chart includes a first chart field and a second chart field. The first option is the first chart field, and the second option is the second chart field. The first chart field and the second chart field may be different chart fields or a same chart field. For example, in a case where the option group is a pie chart, chart fields correspond to parts (i.e., fan-shaped parts) of the pie chart. For example, referring to FIG. 10, the first chart field of the pie chart corresponding to the first option corresponds to part A of the pie chart. The second chart field of the pie chart corresponding to the second option corresponds to part B of the pie chart. On the first interface, the first option is in the selected state, and the second option is in the unselected state. The first chart is displayed on the first interface, but the second chart is not displayed on the first interface. In this case, the user may visually view data related to the first option. On the second interface, the first option is in the unselected state, and the second option is in the selected state. The second chart is displayed on the second interface, but the first chart is not displayed on the second interface. In this case, the user may visually view data related to the second option. For example, referring to FIG. 10, the option group is the pie chart. The first chart field corresponds to part A of the pie chart. That is, the first option is part A of the pie chart. The second chart field corresponds to part B of the pie chart. That is, the second option is part B of the pie chart. As shown in part (A) of FIG. 10, the first option is selected, and the second option is not selected. The first chart is displayed, and the first chart is a line chart. Referring to part (B) of FIG. 10, the second option is selected, and the first option is not selected. The second chart is displayed, and the second chart is also a line chart. The data corresponding to the second chart is different from the data corresponding to the first chart. The first chart and the second chart may be a same type of charts or different types of charts. The data represented by the first chart and the data represented by the second chart may be different or same, which may be designed according to actual conditions, and not limited here.

It will be noted that, the specific number of option group(s) is not limited here, and may be set according to actual conditions. For example, a plurality of option groups may be displayed on a same interface, and the plurality of option groups include a first option group and a second option group. By selecting one option of the first option group, at least two options in the second option group may be used as the first option and second option described above. As a result, the first chart displayed on the first interface may correspond to the first option in the second option group and the selected option in the first option group. The second chart displayed on the second interface may correspond to the second option in the second option group and the selected option in the first option group. For example, the plurality of option groups include at least two of the drop-down menu, the title menu, or the chart. For example, in a case where one menu option is selected from a plurality of menu options in the title menu, different drop-down options in the drop-down menu may be switched. Or, in a case where one menu option is selected from the plurality of menu options in the title menu, and one drop-down option is selected from the plurality of drop-down options in the drop-down menu, different chart fields in the chart are switched.

Figure 8:
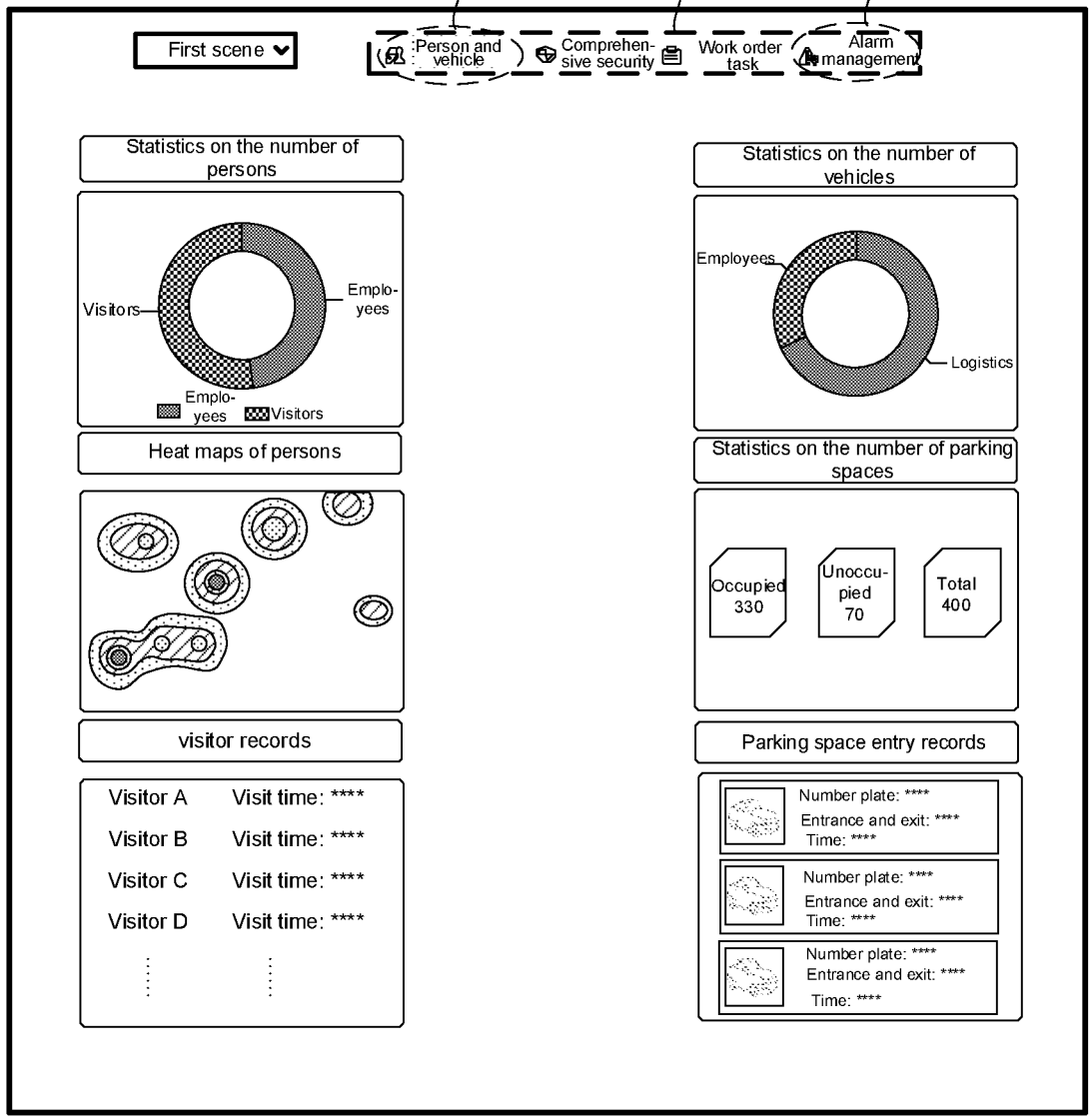
FIG. 8 is a schematic diagram of yet another interface of a data processing method, in accordance with some embodiments.
Figure 9:
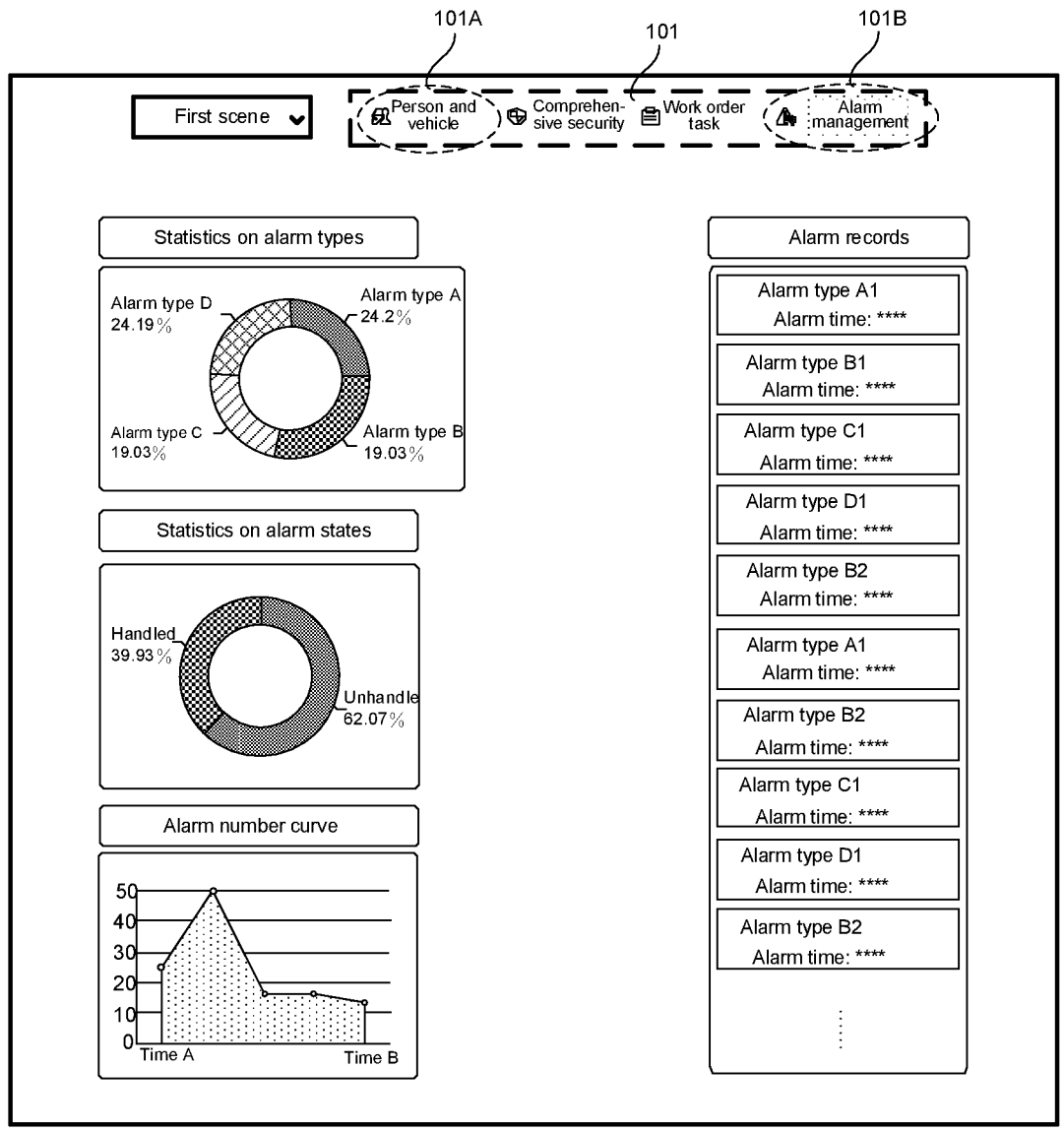
FIG. 9 is a schematic diagram of yet another interface of a data processing method, in accordance with some embodiments.

For example, referring to FIGS. 8 and 9, the drop-down menu is used as the first option group, and the title menu is used as the second option group. One drop-down option (e.g., the first scene) in the drop-down menu is fixed, and title options in the title menu are used as the first option 101A and the second option 101B in the option group 101. For example, the person and vehicle is used as the first option 101A, and the alarm management is used as the second option 101B. In this way, the first chart corresponding to the person and vehicle and the first scene may be displayed on the first interface F1, and the second chart corresponding to the alarm management and the first scene may be displayed on the second interface F2. For example, referring to FIGS. 6 and 7, the title menu is used as the first option group, and the drop-down menu is used as the second option group. One title option (e.g., the comprehensive security) in the title menu is fixed, drop-down options in the drop-down menu are used as the first option 101A and the second option 101B in the option group 101. For example, the first scene is used as the first option 101A, and the second scene is used as the second option 101B. In this way, the first chart corresponding to the first scene and the comprehensive security may be displayed on the first interface F1, and the second chart corresponding to the second scene and the comprehensive security may be displayed on the second interface F2.

Therefore, in the data processing method provided in the embodiments of the present disclosure, the first option is in the selected state and the second option is in the unselected state on the first interface, and the first chart corresponding to the first option is displayed on the first interface; in response to the operation of selecting the second option in the option group on the first interface, the second interface including the option group is displayed; the first option is in the unselected state and the second option is in the selected state on the second interface, and the second chart corresponding to the second option is displayed on the second interface. In this way, the first option is associated with the first chart, and the second option is associated with the second chart. If the first option changes, the first chart may change with the change of the first option. If the second option changes, the second chart may change with the change of the second option. The switching between the first chart and the second chart may be achieved by switching the first option and the second option, so that interaction between the first chart and the first option is achieved, and interaction between the second chart and the second option is achieved. As a result, an effect of data visualization may be improved.

In some embodiments, before displaying the first interface of the option group, the data processing method further includes: setting a corresponding relationship between the first option and the first chart, and a corresponding relationship between the second option and the second chart. In this way, the first chart may be associated with the first option, and the second chart may be associated with the second option. Therefore, in a case where the first option and the second option in the option group are switched, the first chart and the second chart are also switched to display the first chart or the second chart on the interface, or hide the first chart or the second chart on the interface.

For example, setting the corresponding relationship between the first option and the first chart, and the corresponding relationship between the second option and the second chart includes: setting a corresponding item of the first chart as the first option, and setting a corresponding item of the second chart as the second option. For example, the first chart is selected, and the corresponding item of the first chart is set as a corresponding value of the first option by setting the attribute of the first chart. The corresponding value of the first option may characterize the first option. The second chart is selected, and the corresponding item of the second chart is set as a corresponding value of the second option by setting the attribute of the second chart. The corresponding value of the second option may characterize the second option. For example, the corresponding value of the first option may be a name or creation order of the first option, and the corresponding value of the second option may be a name or creation order of the second option. For example, if the first option is created before the second option, the corresponding value of the first option may be menu1, and the corresponding value of the second option may be menu2. In this way, the corresponding item of the first chart may be set to menu1, and the corresponding item of the second chart may be set to menu2, so that the first chart is associated with the first option, and the second chart is associated with the second option.

For example, setting the corresponding relationship between the first option and the first chart, and the corresponding relationship between the second option and the second chart includes: setting the corresponding item of the first chart as the first option in response to first operation on the third interface, and setting the corresponding item of the second chart as the second option in response to second operation on the third interface.

Figure 11A:
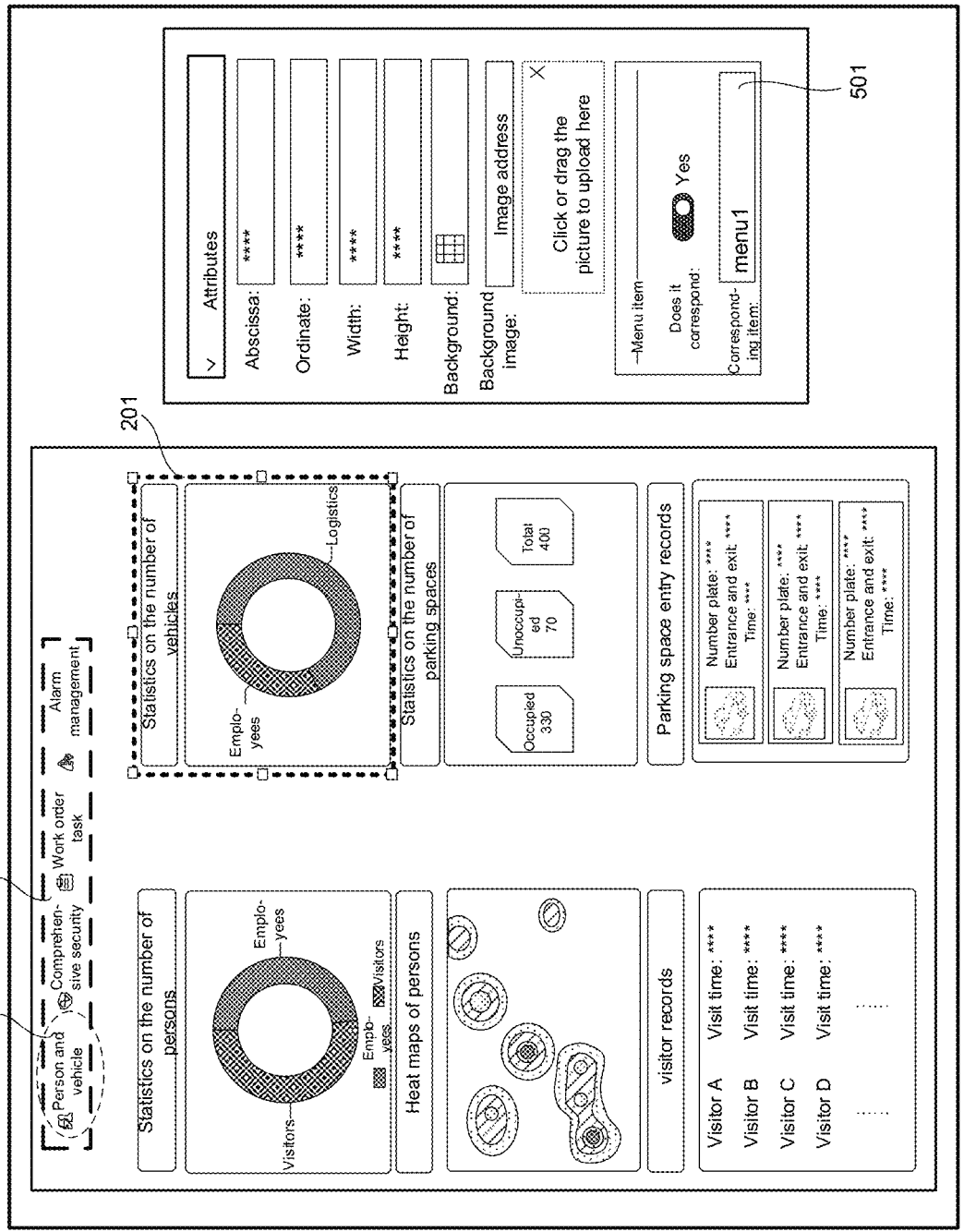
Figure 11B:
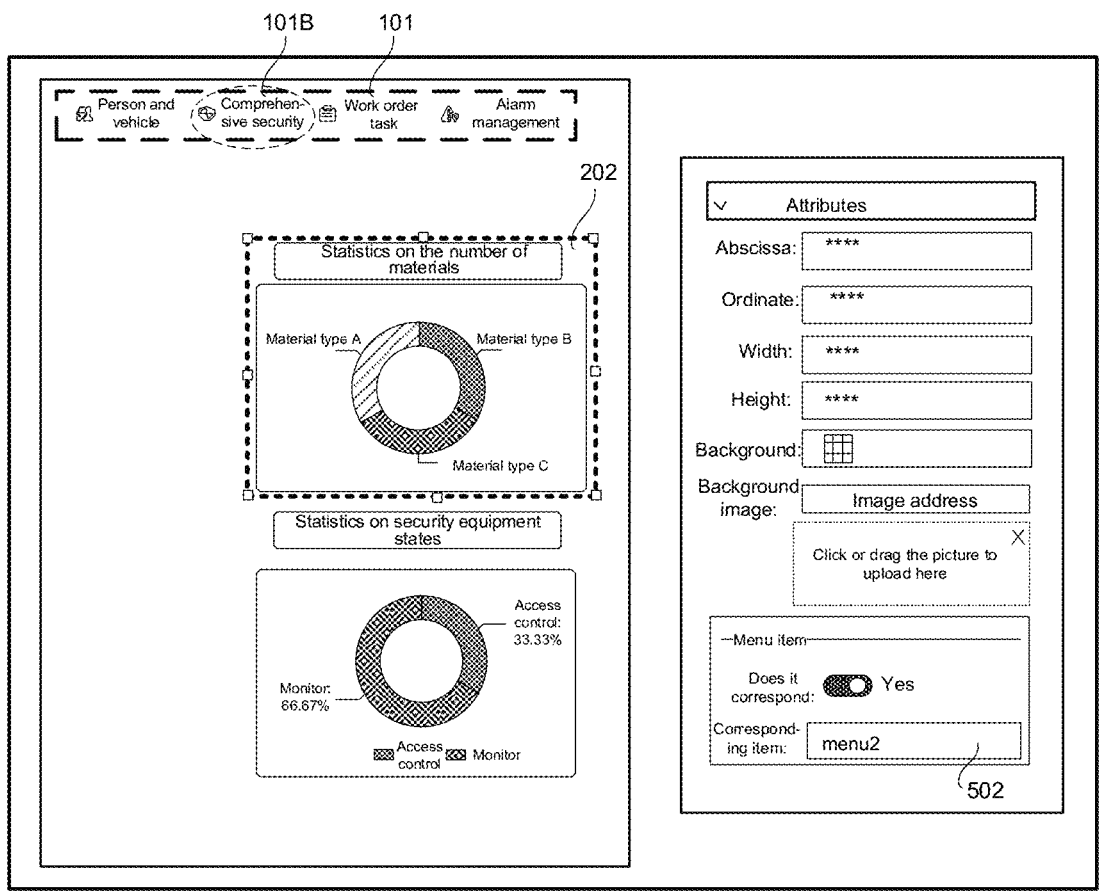
Figure 11C:
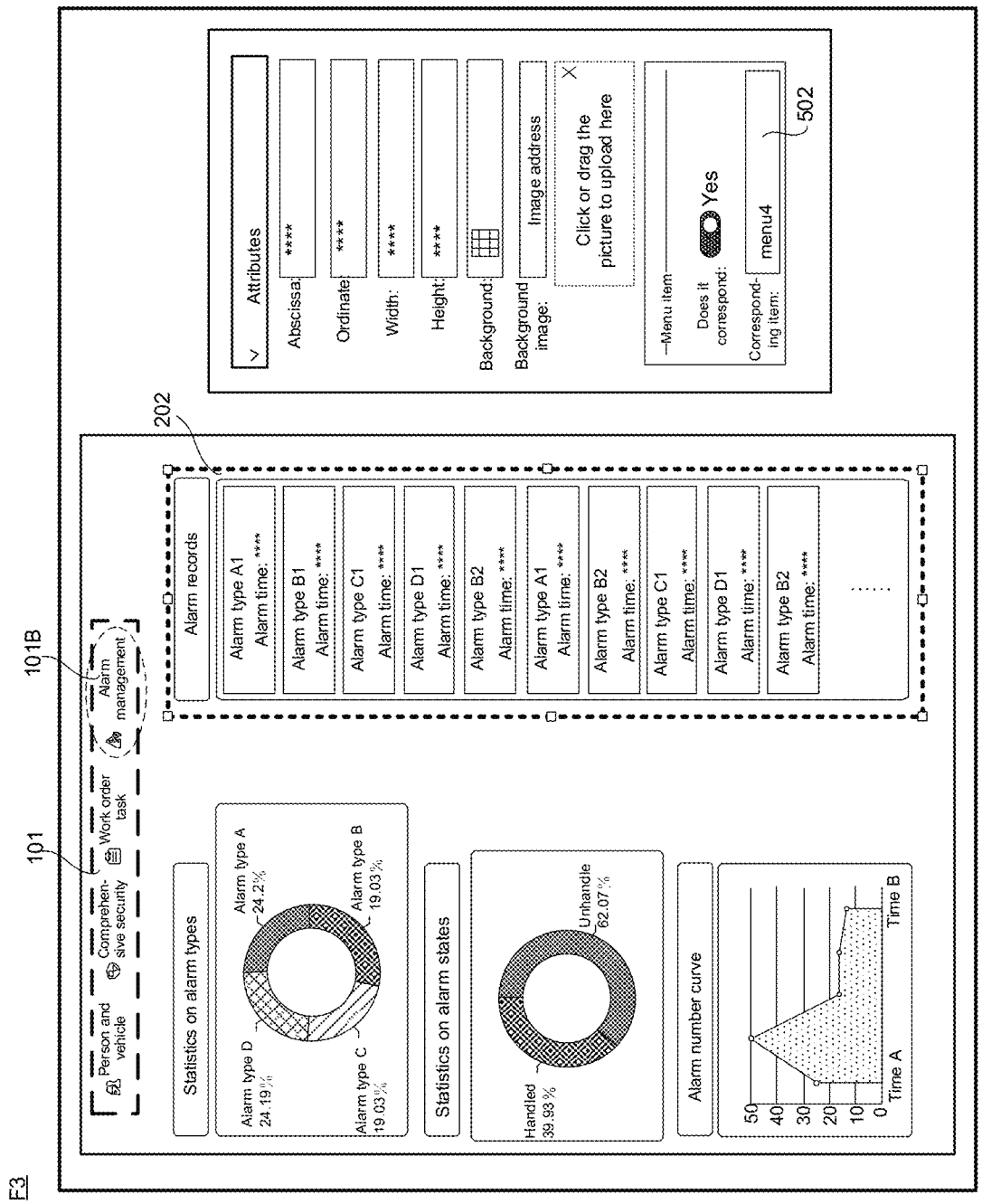

For example, referring to FIG. 11A, a first chart 201 is selected, and the third interface F3 includes a corresponding item input box 501 of the first chart 201. The corresponding value of the first option is input into the corresponding item input box 501 of the first chart 201, and the corresponding item of the first chart 201 may be set as the first option. For example, the first operation may be an operation that the corresponding value menu1 of the first option 101A (e.g., the person and vehicle) is input into the corresponding item input box 501 of the first chart 201. For example, referring to FIG. 11B, a second chart 202 is selected, and the third interface F3 includes a corresponding item input box 502 of the second chart 202. The corresponding value of the second option is input into the corresponding item input box 502 of the second chart 202, and the corresponding item of the second chart 202 may be set as the second option. For example, the second operation may be an operation that the corresponding value menu2 of the second option 101B (e.g., the comprehensive security) is input into the corresponding item input box 502 of the second chart 202. For example, referring to FIG. 11C, a second chart 202 is selected, and the third interface F3 includes a corresponding item input box 502 of the second chart 202. The corresponding value of the second option is input into the corresponding item input box 502 of the second chart 202, and the corresponding item of the second chart 202 may be set as the second option. For example, the second operation may be an operation that a corresponding value menu4 of the second option 101B (e.g., the alarm management) is input into the corresponding item input box 502 of the second chart 202. It will be understood that, referring to FIGS. 11A to 11D, the option group 101 includes four options, and the four options are the person and vehicle, the comprehensive security, the work order task, and the alarm management. The person and vehicle, the comprehensive security, the work order task, and the alarm management are created in sequence; and a corresponding value of the person and vehicle may be menu1, a corresponding value of the comprehensive security may be menu2, a corresponding value of the work order task may be menu3, and a corresponding value of the alarm management may be menu4.

It will be understood that the corresponding value of each option is associated with the option. In this case, the first chart is configured with the corresponding value of the first option, and the second chart is configured with the corresponding value of the second option. For example, if the first option is selected, a corresponding item of the first option publishes an event (emit event). The first chart and the second chart monitor the event. The first chart is configured with the corresponding item (e.g., the corresponding value) of the first option, and the second chart is not configured with the corresponding item (e.g., the corresponding value) of the first option; therefore, the first chart is displayed, and the second chart is not displayed. If the second option is selected, a corresponding item of the second option publishes an event. The first chart and the second chart monitor the event (on event). The second chart is configured with the corresponding item (e.g., the corresponding value) of the second option, and the first chart is not configured with the corresponding item (e.g., the corresponding value) of the second option; therefore, the second chart is displayed, and the first chart is not displayed. In this way, interaction between the option and the chart may be achieved.

In addition, in a case where a chart is selected, the attributes of the chart may be set. For example, abscissa, ordinate, width, height, background, and background image of the chart may be set. The background may be a default background, and the background image may be set by accessing an image address, or clicking or dragging an image to a specified location. An icon of the option may also be set. The icon may be set by clicking or dragging an image to the specified location; in this way, each option in the option group may display a corresponding icon.

In some embodiments, the data processing method further includes: displaying a third interface. The third interface includes the first chart or associated chart(s) of the first chart, and the second chart or associated chart(s) of the second chart. The associated chart of the first chart and the first chart belong to the first chart component. The associated chart of the second chart and the second chart belong to the second chart component.

It will be noted that, a component is an independent and reusable individual instance, and essence of the component is to encapsulate static, dynamic or a series of logic. The component may include attribute information of the component and a method of achieving a preset function. The attribute information may include access objects of data of the component, for example, attributes such as width and height. The preset function may include a function that may be achieved by the component. In specific programming, the method of achieving the preset function may be expressed in a form of a function. The component may be used as an encapsulation body of the data of the component and the function that may be achieved by the component. The component can reuse hardware, and exchange data with other components.

For example, charts belonging to a same chart component have a same chart type. For example, the first chart and the associated chart of the first chart have a same chart type. Charts of the same chart type are displayed on the interface (e.g., the first interface). For example, the first chart and the associated chart of the first chart are vertical column charts.

The second chart and the associated chart of the second chart have a same chart type. Charts of the same chart type are displayed on the interface (e.g., the second interface). For example, the second chart and the associated chart of the second chart are horizontal column charts. For example, data content of displayed charts belonging to a same chart component may be different. For example, data of the first chart may be different from data of the associated chart of the first chart. For example, the associated chart of the first chart may be the first chart in an initial state. That is, a chart displayed when the first chart is not configured may be the associated chart of the first chart. Data of the second chart may be different from data of the associated chart of the second chart. For example, the associated chart of the second chart may be the second chart in an initial state. That is, a chart displayed when the second chart is not configured may be the associated chart of the second chart. For example, the chart component may be a chart component in ECharts or other chart libraries.

For example, setting the corresponding relationship between the first option and the first chart, and the corresponding relationship between the second option and the second chart include: receiving operation of selecting the first chart or the associated chart of the first chart on the third interface, and setting a corresponding item in the first chart component as the first option; and receiving operation of selecting the second chart or the associated chart of the second chart on the third interface, and setting a corresponding item in the second chart component as the second option.

It will be understood that, referring to FIG. 13A, the first chart or the associated chart of the first chart is selected on the third interface F3, and the corresponding item in the first chart component 610 is set as the corresponding value menu1 of the first option. In this way, the first chart belonging to the first chart component and the associated chart of the first chart belonging to the first chart component may be associated with the first option. Referring to FIG. 13C, in a case where the first option is selected, the first chart or the associated chart of the first chart may be displayed. Referring to FIG. 13B, the second chart or the associated chart of the second chart is selected on the third interface F3, and the corresponding item in the second chart component 620 is set as the corresponding value menu2 of the second option. In this way, the second chart belonging to the second chart component and the associated chart of the second chart belonging to the second chart component may be associated with the second option. Referring to FIG. 13C, in a case where the second option is selected, the second chart or the associated chart of the second chart may be displayed. In this case, the corresponding item in the chart component is set as an option, and all chart(s) in the chart component correspond to the option. That is, the option is selected, and at least one chart in the chart component may be displayed.

For example, in a process of setting the corresponding item in the chart component, a corresponding item setting column (e.g., a "menu item" column in FIGS. 13A and 13B) of the chart component may be displayed. The corresponding item setting column includes an allowable corresponding switch item (e.g., the sliding switch at "does it correspond" in FIGS. 13A and 13B) and a corresponding item input box (e.g., at the "corresponding item" in FIGS. 13A and 13B). The allowable corresponding switch item is turned on, and a corresponding value of an option is input into the corresponding item input box. As a result, the chart component is configured with a corresponding value of the option. In this case, in a process of publishing the event by the option, each chart component may monitor the event. The chart component configured with the corresponding value of the option will respond to information corresponding to the publishing event to display chart(s) belonging to the chart component. For example, after the option is selected, the chart component configured with the corresponding value of the option may display chart(s) belonging to the chart component, thereby achieving the interaction between the option and the chart component.

In some embodiments, setting the corresponding relationship between the first option and the first chart, and the corresponding relationship between the second option and the second chart includes the following steps.

Data items of the option group are configured. The data items of the option group include first data items and second data items corresponding to the first data items, and the first data items are configured to distinguish the first option from the second option. For example, referring to FIGS. 14A and 14B, the first data items in the data items of the option group are bound to a variable name. In this case, option A of the option group is displayed as the first scene, and option B of the option group is displayed as the second scene. The second data items are bound to a variable id. Data corresponding to option A (i.e., the first option) is data of the variable id when the variable name is the first scene. Data corresponding to option B (i.e., the second option) is data of the variable id when the variable name is the second scene. For example, the first data items in the option group may be used to identify the option group. For example, the first data items in the option group are displayed on the interface, and the second data items are not displayed on the interface. Content of first data items of different options in the option group is different. For example, in a case where the option group is the drop-down menu, the first data item of the first option may be the first scene, and the first data item of the second option may be the second scene. For example, in a case where the option group is the title menu, the first data item of the first option may be the person and vehicle, and the first data item of the second option may be the comprehensive security. For example, in a case where the option group is the chart, the first data item corresponding to the first option may be a first chart field of the chart, and the first chart field represents a first category. The first data item corresponding to the second option may be a second chart field of the chart, and the second chart field represents a second category.

A third chart is created, and the third chart includes at least two third data items. For example, referring to FIG. 15A, the third chart 203 is selected on the third interface F3, and the third data items of the third chart 203 may be set. For example, the third chart may be the first chart in an initial state or the second chart in an initial state. For example, the at least two third data items in the third chart may represent data of the third chart. For example, the at least two third data items in the third chart (a chart with abscissa and ordinate such as a column chart or a line chart) may be data on the abscissa and data on the ordinate.

At least one third data item in the third chart is mapped to the second data item. In a case where the at least one third data item in the third chart is mapped to the second data item corresponding to the first option, the third chart is the first chart. In a case where the at least one third data item in the third chart is mapped to the second data item corresponding to the second option, the third chart is the second chart.

It will be understood that, the at least one third data item in the third chart is mapped to the second data item corresponding to the first option, so that the third chart is associated with the first option; and data corresponding to the second data item corresponding to the first option may be transmitted to the at least one third data item in the third chart. In this case, data corresponding to the first chart is related to the data corresponding to the second data item corresponding to the first option. The at least one third data item in the third chart is mapped to the second data item corresponding to the second option, so that the third chart is associated with the second option; and data corresponding to the second data item corresponding to the second option may be transmitted to the at least one third data item in the third chart. In this case, data corresponding to the second chart is related to the data corresponding to the second data item corresponding to the second option. Based on the above, if the data corresponding to the second data item corresponding to the first option changes, the data corresponding to the first chart also changes accordingly; therefore, the interaction between the first option and the first chart is achieved. If the data corresponding to the second data item corresponding to the second option changes, the data corresponding to the second chart also changes accordingly; therefore, the interaction between the second option and the second chart is achieved.

In some embodiments, setting the corresponding relationship between the first option and the first chart, and the corresponding relationship between the second option and the second chart includes:

configuring visualization component(s) of the option group, the visualization component(s) including first data items and second data items corresponding to the first data items, and the first data items being configured to distinguish the first option from the second option; and configuring a chart component including at least two third data items, so as to map at least one third data item in the chart component to the second data item; in a case where the at least one third data item in the chart component is mapped to the second data item corresponding to the first option, a displayed chart being the first chart; and in a case where the at least one third data item in the chart component is mapped to the second data item corresponding to the second option, the displayed chart being the second chart.

It will be understood that, the visualization component(s) of the option group may include attribute information of the option group and a method of achieving a preset function. The attribute information may include access objects of data of the option group, for example, attributes such as width and height. The preset function may include a function that may be achieved by the option group. In specific programming, the method of achieving the preset function may be expressed in a form of a function. The visualization component(s) of the option group may be used as an encapsulation body of the data of the option group and the function that may be achieved. The visualization component(s) of the option group can reuse hardware, and exchange data with other components.

For example, there may be visualization components of option groups. Referring to FIG. 14C, the visualization components of the option groups may be displayed on a sixth interface F6, and at least one visualization component of the option group in the visualization components of the option groups may be selected and dragged onto the interface. The first data item in the visualization component may be used to identify the visualization component. For example, the first data item in the visualization component is displayed on the interface, and the second data item in the visualization component is not displayed on the interface.

Content of the first data items of different options in the visualization component(s) is different.

In some embodiments, setting the corresponding relationship between the first option and the first chart, and the corresponding relationship between the second option and the second chart includes the following steps.

A fourth interface is displayed, and the fourth interface includes the option group in an initial state. For example, an option group is selected in a selection box of the option groups (for example, referring to FIG. 14C, the selection box 730 of the option groups may be displayed on the sixth interface F6); and the selected option group is dragged to obtain the option group in the initial state (e.g., the option group in the initial state corresponding to the first visualization component 710 displayed on the fourth interface F4 in FIG. 14A or the option group in the initial state corresponding to the second visualization component 720). For example, each data item of the option group in the initial state may be empty or an initial default value.

Operation of selecting the option group in the initial state on the fourth interface, and operation of configuring the visualization component(s) of the option group are received. The visualization component(s) include first data items and second data items corresponding to the first data items, and the first data items are configured to distinguish the first option from the second option. For example, referring to FIGS. 14A and 14B, the option group in the initial state is selected on the fourth interface F4 to obtain a data source corresponding to the option group. The first data items are bound to a variable in the data source corresponding to the option group, and the second data items are bound to another variable in the data source corresponding to the option group. For example, the data source corresponding to the option group includes a variable name and a variable id. The first data items are bound to the variable name, and the second data items are bound to the variable id, so that the data corresponding to the first data items is the data corresponding to the variable name in the data source, and the data corresponding to the second data items is the data corresponding to the variable id in the data source.

Figure 12:
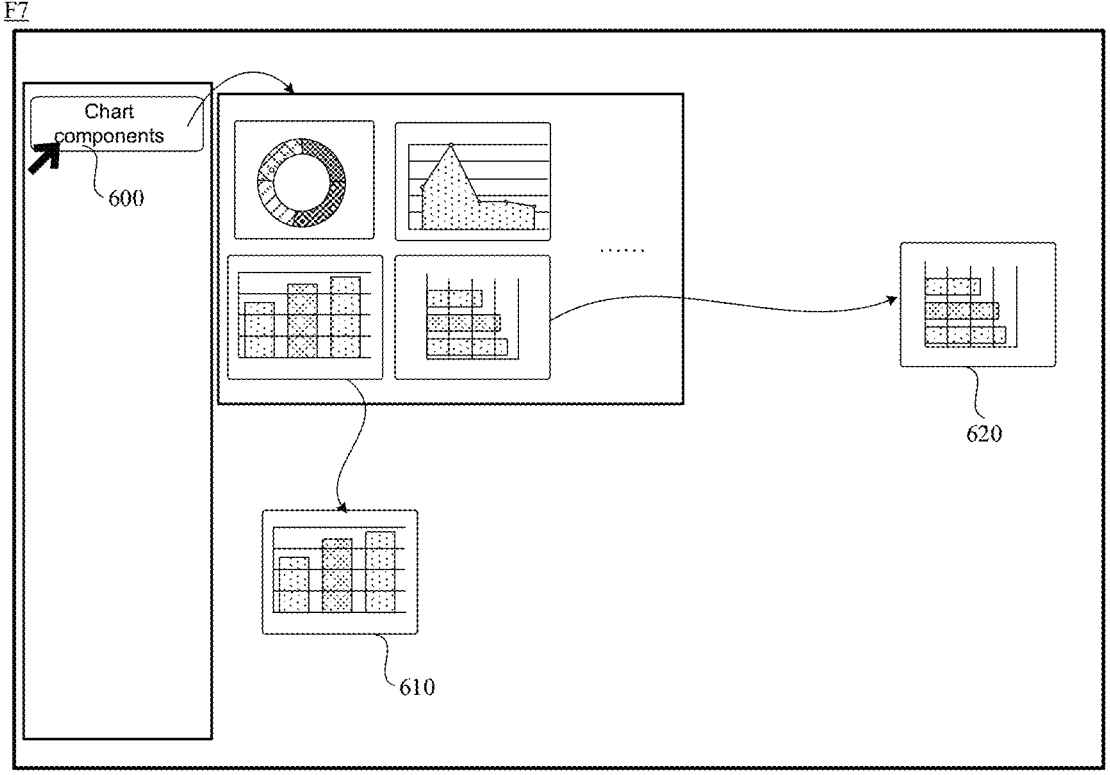
FIG. 12 is a schematic diagram of yet another interface of a data processing method, in accordance with some embodiments.

A fifth interface is displayed, and the fifth interface includes third chart(s). For example, chart component(s) to which the third chart(s) belong are selected in a chart component library and are dragged to the fifth interface, so as to obtain the third chart(s). In this case, the third chart(s) have not been configured. For example, the third chart(s) are in an initial state. For example, referring to FIG. 12, a plurality of chart components may be displayed on a seventh interface F7, and a chart component (e.g., the first chart component 610) and another chart component (e.g., the second chart component 620) are selected from the plurality of chart components; and the selected chart components may be dragged and moved to a suitable position on the interface to obtain the third charts.

A chart component including at least two third data items to which the third chart belongs is configured, so as to map at least one third data item in the chart component to the second data item. In a case where the at least one third data item in the chart component is mapped to the second data item corresponding to the first option, a displayed chart being the first chart, and in a case where the at least one third data item in the chart component is mapped to the second data item corresponding to the second option, the displayed chart is the second chart. For example, referring to FIGS. 15A to 15C, the chart component of the third chart 203 is configured, and at least one third data item (i.e., the third data item 2) is mapped to the second data item. In this way, in a case where the at least one third data item is mapped to the second data item corresponding to the first option, the first option is selected, and the third chart is rendered to obtain the first chart. In a case where the at least one third data item is mapped to the second data item corresponding to the second option, the second option is selected, and the third chart is rendered to obtain the second chart.

It will be understood that, the at least one third data item in the chart component is mapped to the second data item corresponding to the first option, so that the chart component is associated with the first option; data corresponding to the second data item corresponding to the first option may be transmitted to the at least one third data item in the chart component; and according to the received data corresponding to the second data item corresponding to the first option, the chart component may obtain the first chart through rendering, and display the first chart. In this case, data corresponding to the first chart is related to the data corresponding to the second data item corresponding to the first option. The at least one third data item in the chart component is mapped to the second data item corresponding to the second option, so that the chart component is associated with the second option; data corresponding to the second data item corresponding to the second option may be transmitted to the at least one third data item in the chart component; and according to the received data corresponding to the second data item corresponding to the second option, the chart component may obtain the second chart through rendering, and display the second chart. In this case, data corresponding to the second chart is related to the data corresponding to the second data item corresponding to the second option. Based on the above, if the data corresponding to the second data item corresponding to the first option changes, the data corresponding to the first chart also changes accordingly; therefore, the interaction between the first option and the first chart is achieved. If the data corresponding to the second data item corresponding to the second option changes, the data corresponding to the second chart also changes accordingly; therefore, the interaction between the second option and the second chart is achieved. In addition, in a case where the second data item corresponding to the first option or the second option changes, there is no need to recreate a chart. The first option or the second option may transmit parameter(s) to an associated chart component, and data content presented by the chart component changes accordingly, so that the user may obtain the latest data.

For example, mapping the at least one third data item in the chart component to the second data item includes: binding the first variable in the data source corresponding to the second data item to the second variable, and binding the at least one third data item in the chart component to the second variable.

The data source refers to a database or a database server used by a database application program, and is a device or an original media for providing data. All information for establishing a database connection is stored in the data source. For example, the data source may include a dynamic data source and a static data source. Data in the dynamic data source may be changed in real time, and data in the static data source may be fixed. For example, the dynamic data source includes data obtained from an application system or the database through application program interface (API), or data obtained by accessing the database through a program language (e.g., structured query language (SQL)). For example, the static data source includes data of a pre-configured comma-separated values (CSV) file, or user-defined data (e.g., data input by the user).

It will be understood that, the second data items are bound to the first variable (the variable id shown in FIG. 14B) in the data source corresponding to the second data items, so that the data corresponding to the second data items is data represented by the first variable in the data source corresponding to the second data items. In this case, the first variable in the data source corresponding to the second data items is bound to the second variable (the variable val shown in FIG. 14D), so that the data represented by the second variable is the data represented by the first variable in the data source corresponding to the second data items. The data that is received by the at least one third data item, bound to the second variable, in the chart component is same. The data that is received by the at least one third data item, bound to the second variable, in the chart component is the data corresponding to the second variable, i.e., the data represented by the first variable in the database corresponding to the second data items.

It will be understood that, in a case where the third data item(s) in the chart component are not bound to the second variable, the third data item(s) in the chart component are bound to a third variable (a variable x_size shown in FIG. 15A) in a data source corresponding to the third data item(s). In this case, the data corresponding to the third data item(s) is data represented by the third variable in the data source corresponding to the third data item(s). In a process of binding the third data item(s) in the chart component to the second variable, the third variable corresponding to the third data item(s) may be bound to the second variable. In this case, the third data item(s) are bound to the second variable, so that data corresponding to the third data item(s) is the data represented by the second variable, i.e., the data represented by the first variable in the data source corresponding to the second data items. In this way, it may be achieved that the option group (i.e., the visualization component of the option group) transmits data to the chart component. In a process of switching different options of the option group, data content of the chart component is also switched accordingly.

For example, binding the first variable in the data source corresponding to the second data item to the second variable includes: receiving the second variable input by the user in a binding input box of the second data item, so that the first variable in the data source corresponding to the second data item is bound to the second variable input in the binding input box. For example, referring to FIG. 14D, on an eighth interface F8, a variable name of the second variable, for example, val, is input in the binding input box (e.g., "bind variable" in FIG. 14D) of the second data item, so that the first variable in the data source corresponding to the second data item is bound to the second variable val input in the binding input box. The eighth interface and the fourth interface may be a same interface.

The name of the second variable may be user-defined, which is not limited here. For example, the visualization component(s) of the option group are selected, and a data source corresponding to the visualization component(s) of the option group, i.e., the data source corresponding to the second data item, is set in a data selection column (e.g., a data selection column shown in FIG. 14A) corresponding to the visualization component(s) of the option group. For example, a type of data source may be selected in the data selection column corresponding to the visualization component(s) of the option group. For example, a database may be selected as the data source, and the selected data source includes the first variable. A field mapping between the second data item and the first variable is established. For example, the first variable, for example id, is input in a field mapping input box (e.g., a field mapping input box shown in FIG. 14A) corresponding to the second data item, so that the second data item is bound to the first variable in the data source corresponding to the second data item.

For example, in a case where the database is selected as the data source, data in the database may be obtained through SQL, and the data may also be previewed on the interface. For example, the data in the database is obtained by clicking "obtain data", and the obtained data is displayed by clicking "preview data" on the interface. For example, the obtained database may include a plurality of variables, and one (i.e., the first variable) of the plurality of variables may be input in the field mapping input box corresponding to the second data item, so that the second data item is bound to the input variable.

For example, the first data items and the second data items in the visualization component(s) of the option group belong to a same data source. In a case where the data source corresponding to the second data items is obtained, the first data items may be configured. For example, one of the plurality of variables is input in a field mapping input box corresponding to the first data items, so that the first data items are bound to the input variable. Data corresponding to the first data items is data corresponding to the input variable. The variable in the data source bound to the first data items is related to the variable in the data source bound to the second data items. For example, the first data item represents a category, and the second data item represents data content (e.g., value) corresponding to the category. For example, the data source corresponding to the visualization component(s) of the option group includes two variables, i.e., name and id. The first data items may be bound to one of the two variables, and the second data items may be bound to the other of the two variables. For example, name is input into the field mapping input box corresponding to the first data items, and id is input into the field mapping input box corresponding to the second data items. In this way, the data corresponding to the first data items is data corresponding to the variable name, the data corresponding to the second data items is data corresponding to the variable id, and the variable id is the first variable.

In addition, the data corresponding to the first data items may be displayed on the interface that displays the option group. That is, the data corresponding to the variable name may be displayed to distinguish different options in the option group. For example, in a case where the data corresponding to the variable name includes the first scene and the second scene, the data corresponding to the first data items of the option group is the first scene and the second scene, so that the first option and the second option of the option group may be distinguished. For example, the first option of the option group is the first scene, and the second option is the second scene. The number of options in the option group may be related to the data corresponding to the first data items. For example, the number of data corresponding to the first data items is related to the number of options in the option group. For example, the number of data corresponding to the first data items is equal to the number of options in the option group.

For example, the data source corresponding to the chart component is set in a data selection column corresponding to the chart component. For example, a type of data source may be selected in the data selection column corresponding to the chart component. For example, the database may be selected as the data source, and the selected data source includes a third variable. A field mapping between the at least one third data item and the third variable is established. For example, the third variable (e.g., the variable x_size shown in FIG. 15A) is input in a field mapping input box corresponding to the at least one third data item, so that the at the least one third data item is bound to the third variable. In this case, data corresponding to the at least one third data item is the data represented by the third variable. For example, the third data item(s) in the chart component are bound to the second variable. Referring to FIG. 14D, the second variable is defined as val. Referring to FIG. 15B, "x_size=$val" may indicate that the third data item(s) are bound to the second variable.

In this case, in a case where the first option in the option group is selected and the second option in the option group is not selected, the first option in the option group triggers an interactive event, and the chart component bound to the second variable may monitor the event, so that data corresponding to at least one third data item in the chart component bound to the second variable may be the data corresponding to the second data item corresponding to the first option. In a case where the second option in the option group is selected and the first option in the option group is not selected, the second option in the option group triggers an interactive event, and the chart component bound to the second variable may monitor the event, so that the data corresponding to the at least one third data item in the chart component bound to the second variable may be the data corresponding to the second data item corresponding to the second option. In this way, when different options in the option group are switched, data corresponding to the chart component may change accordingly. For example, referring to FIG. 15C, data content of the first chart displayed based on the first option (i.e., the first scene) is different from data content of the second chart displayed based on the second option (i.e., the second scene). As a result, the communication between the option group (i.e., the visualization component(s) of the option group) and the chart component may be achieved, so that real-time data switching may be achieved through parameter transmission between the option group and the chart component.

For example, before the first variable in the data source corresponding to the second data item is bound to the second variable, the data processing method further includes: turning on a publishing event switch item corresponding to the second data item of the visualization component.

For example, the visualization component is selected, and the visualization component has the publishing event switch item (e.g., "switch data item event" on the eighth interface F8 in FIG. 14D) corresponding to the second data item. When the publishing event switch item corresponding to the second data item of the visualization component is turned on, for example, when the "switch data item event" is checked in FIG. 14D, a switch item event corresponding to the second data item of the visualization component is sent to other component(s) (e.g., including the chart component), and the other component(s) monitor the switch item event corresponding to the second data item of the visualization component. In a case where data item(s) in other component(s) (e.g., at least one third data item in the chart component) is mapped to the second data item of the visualization component, data corresponding to the second data item of the visualization component may be transmitted to the data item(s) of the other component(s). In this way, when the data corresponding to the second data item of the visualization component changes or switches, data corresponding to the data item(s) in the other component(s) also changes or switches accordingly. That is, data corresponding to the at least one third data item in the chart component also changes or switches accordingly, thereby achieving the interaction between the visualization component and the other component(s) (e.g., the chart component).

In some embodiments, mapping the at least one third data item in the chart component to the second data item includes: turning on the publishing event switch item corresponding to the second data item of the visualization component; binding the at least one third data item in the chart component to a placeholder written in the second data item; and turning on a receiving event switch item of the chart component, so that the at least one third data item in the chart component is mapped to the second data item.

Figure 16A:
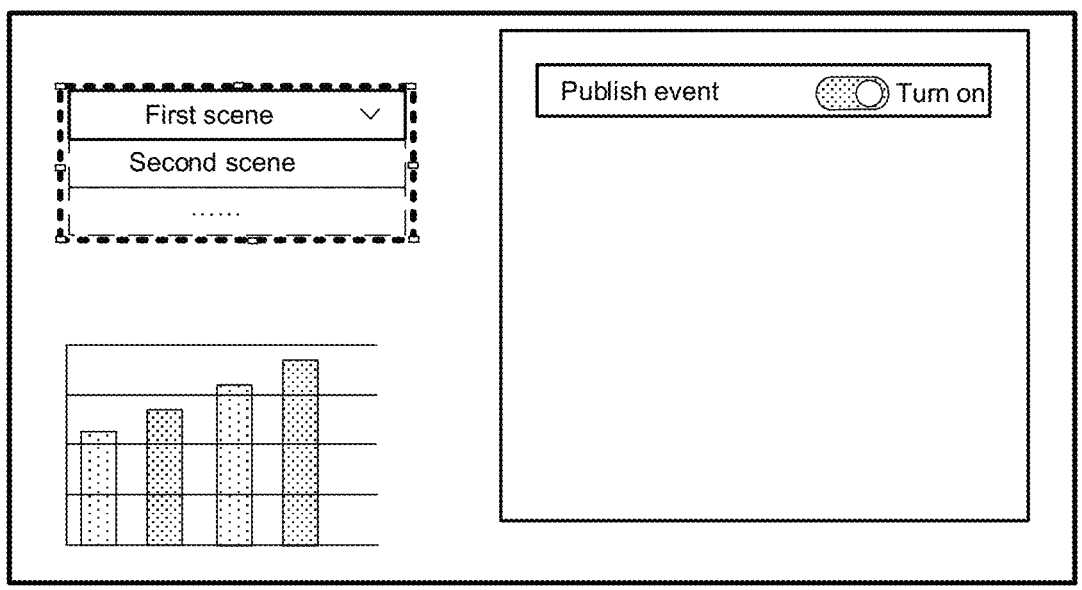
FIGS. 16A to 16C are schematic diagrams of interfaces of a data processing method, in accordance with some embodiments.
Figure 16B:
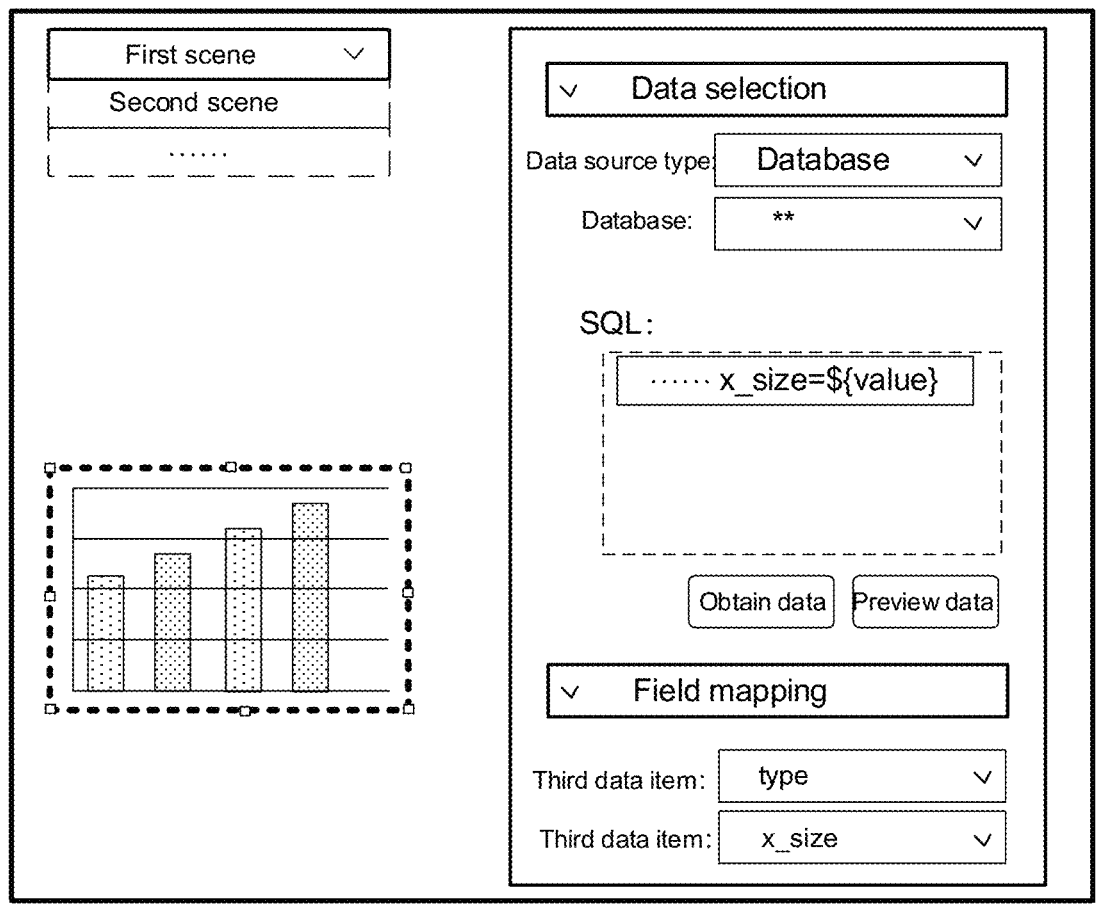
Figure 16C:
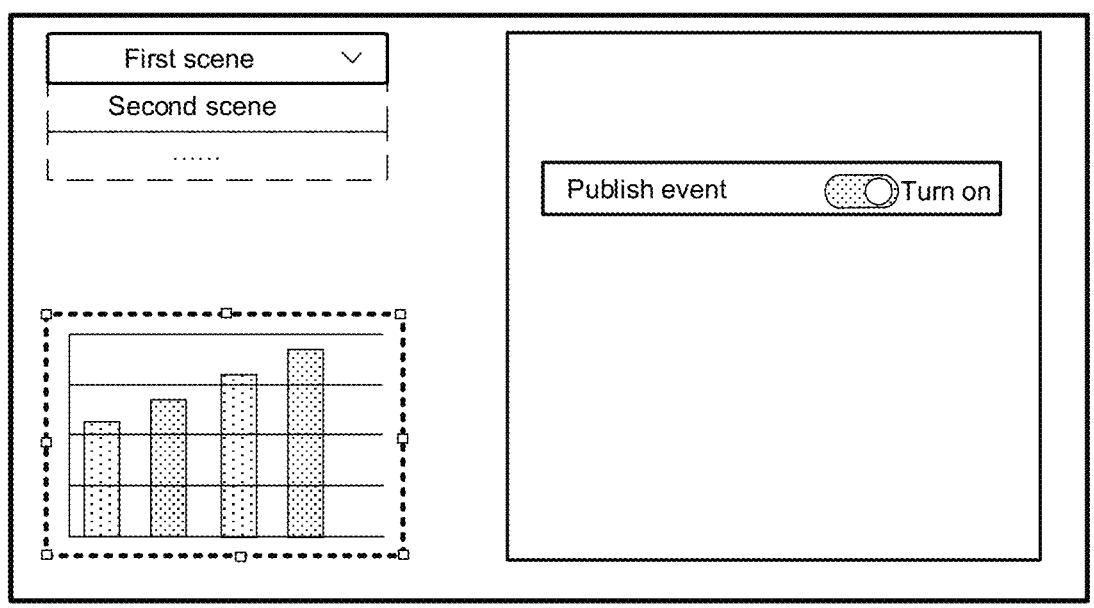
Figure 17A:
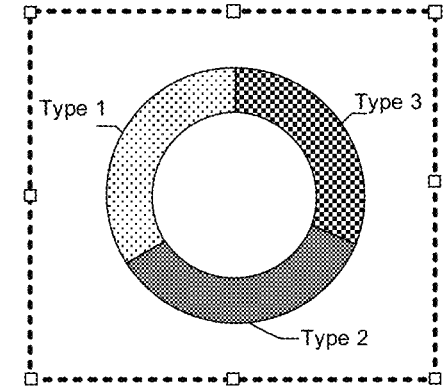
FIGS. 17A to 17E are schematic diagrams of interfaces of a data processing method, in accordance with some embodiments.
Figure 17B:
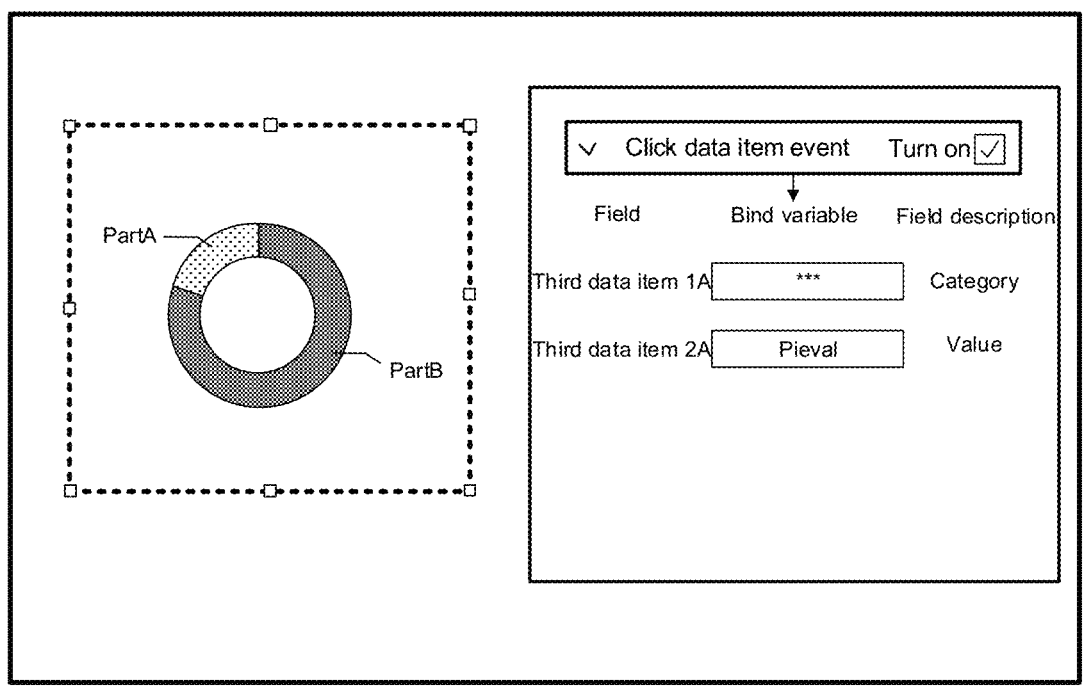
Figure 17C:
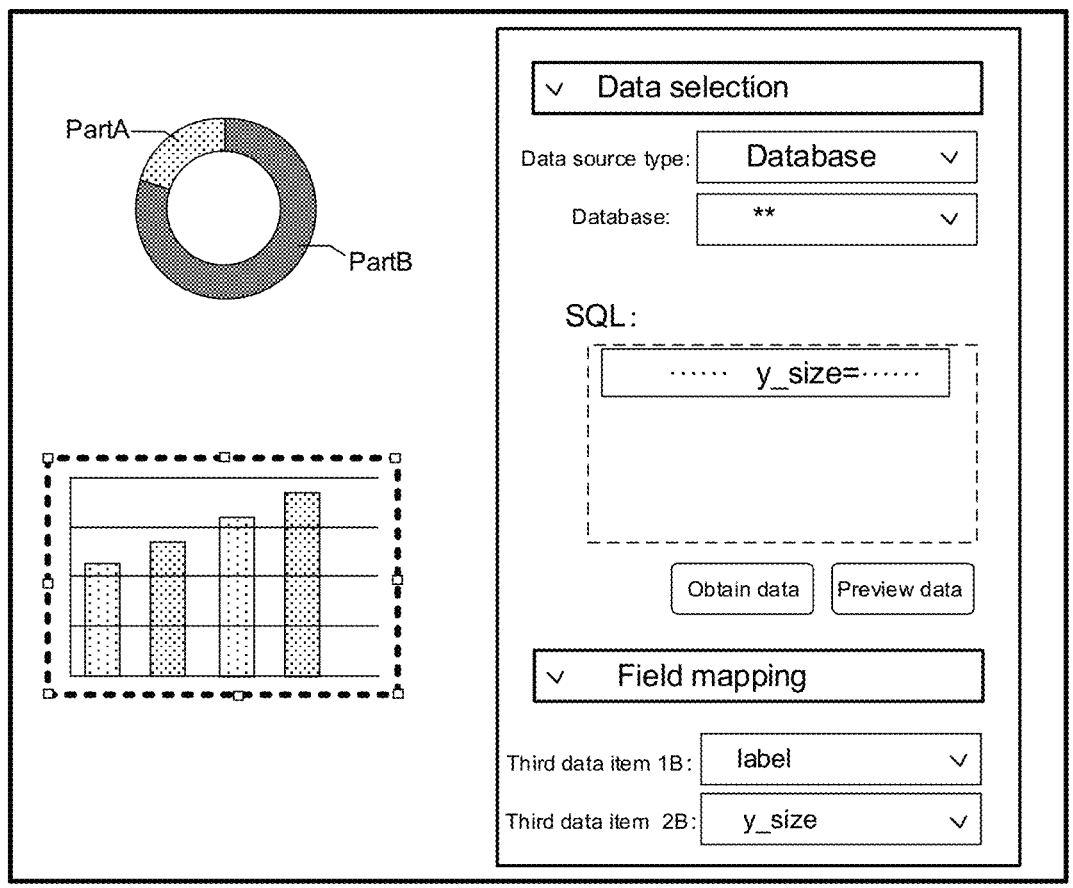
Figure 17D:
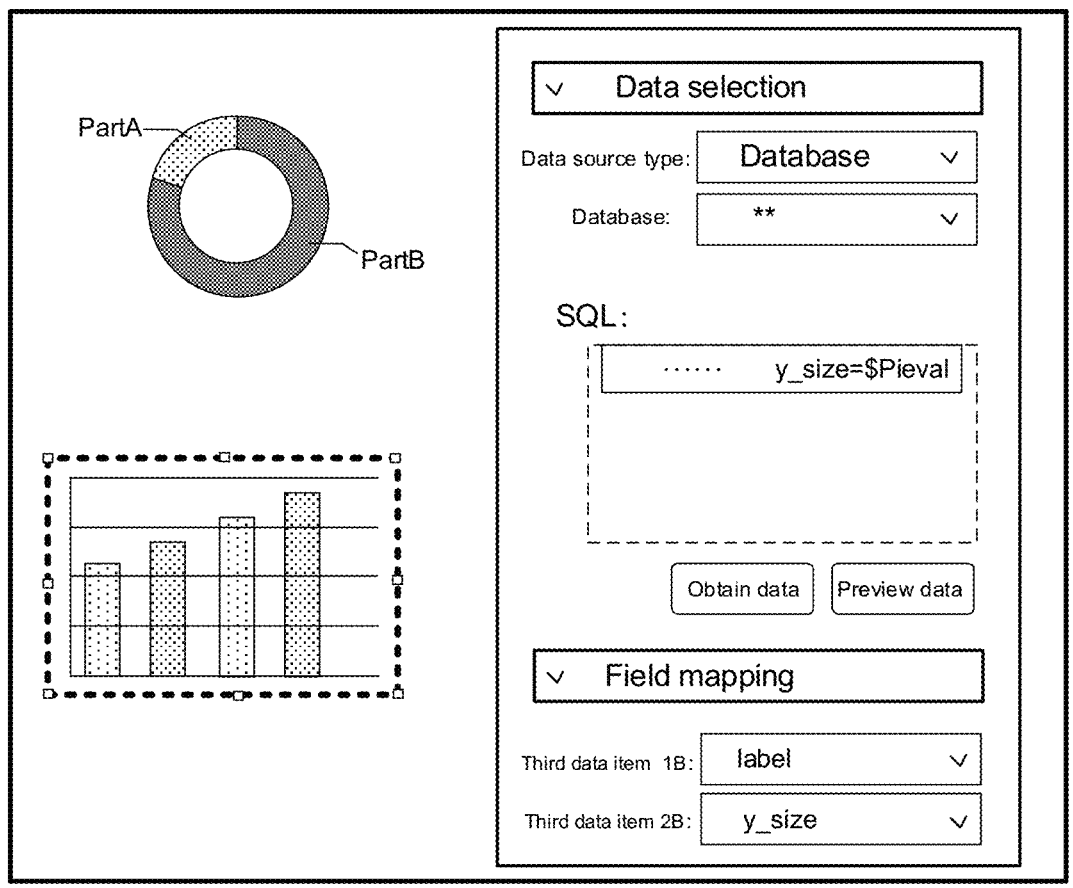
Figure 17E:
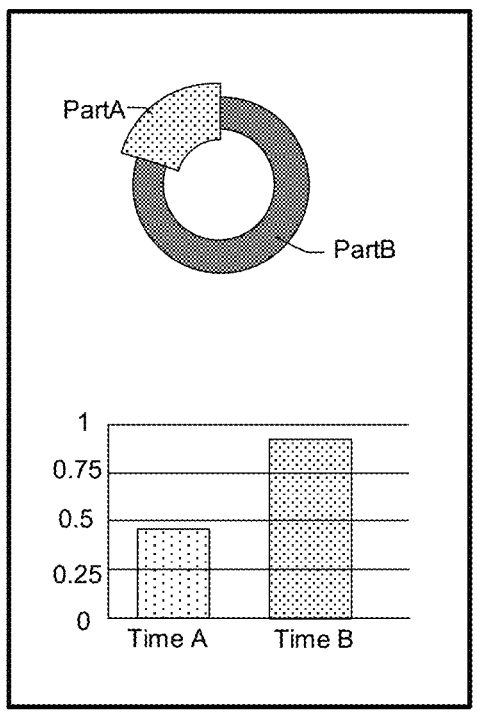
Figure 17E:
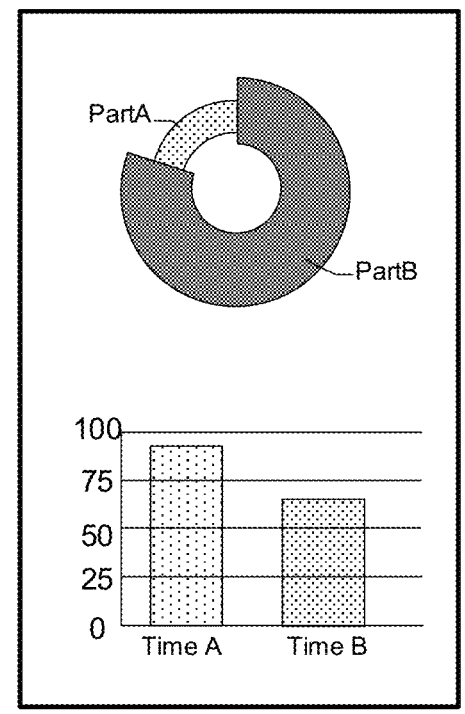

For example, the publishing event switch item (e.g., a sliding switch corresponding to the publishing event on the ninth interface F9 in FIG. 16A) corresponding to the second data item of the visualization component (i.e., the option group) is turned on. In a case where the second data item of the visualization component is expressed as value, the placeholder written in the second data item may be expressed as ${value}. For example, the at least one third data item in the chart component is bound to the third variable in the data source corresponding to the chart component. Referring to FIG. 16B, the third variable is expressed as x_size. In this case, binding the at least one third data item in the chart component to the placeholder written in the second data item may be expressed as x_size=${value}. In this way, the receiving event switch item (e.g., a sliding switch corresponding to the receiving event on the tenth interface F10 in FIG. 16C) of the chart component is turned on. That is, event interaction between the visualization component and the chart component is turned on. The chart component may monitor the publishing event corresponding to the second data item of the visualization component. In this case, the data corresponding to the second data item may be transmitted to the at least one third data item, bound to the placeholder written in the second data item, in the chart component.

For example, data may be transmitted between different components (e.g., between the chart component and the visualization component of the option group, or between the chart components) through, for example, an event bus. That is, a component (i.e., a component for publishing an event) uses "emit" to publish an event to inform other component(s) through a manner of the event bus. The other component(s) use "on" to receive the event and perform corresponding operation, so that the component sends data corresponding to the component to the other component(s) (i.e. component(s) for receiving the event). As a result, interaction or communication between the component and the components (e.g., one-to-one or one-to-more) may be achieved. For example, when a component changes, other component(s) take corresponding action in response to an event value transmitted through the event bus. For example, when data corresponding to the visualization component of the option group changes, the chart component re-renders the chart in response to data transmitted through the event bus, so as to obtain an updated chart. For example, in a 3D model, the visualization component of the option group sends an event. The chart component receives the event through the event bus, and sends agreed messages and data through a unity model (which may also be used as a component).

For example, for interaction between a chart component (e.g., a chart) and another chart component (e.g., another chart), one of the chart components may be used as the visualization component of the option group. That is, the chart is used as the option group to interact with the another chart component. For example, as shown in FIGS. 17A to 17E, a third data item 1A in an initialized chart component (e.g., a ring chart) may be used as the first data item, and is bound to a variable (e.g., variable de) in a data source corresponding to the third data item 1A; a third data item 2A in an initialized chart component (e.g., a ring chart) may be used as the second data item, and is bound to a variable (e.g., variable x_size) in a data source corresponding to the third data item 2A. As a result, options of the chart may be obtained. For example, a portion PartA in the ring chart is used as the first chart field, i.e., the first option, and a portion PartB in the ring chart is used as the second chart field, i.e., the second option. A user-defined variable name, such as Pieval, is input in a binding input box (e.g., "bind variable") of the third data item 2A, so that the variable x_size in the data source corresponding to the third data item 2A is bound to the variable Pieval input in the binding input box. A third data item 1B in another initialized chart component (e.g., a column chart) is bound to a variable (e.g., variable label) in a data source corresponding to the third data item 1B, another third data item 2B is bound to a variable (e.g., variable y_size) in a data source corresponding to the third data item 2B. The third data item 2B is bound to the variable Pieval, that is, y_size=$Pieval. In this way, in a case where different chart fields of the chart are switched, data content of a column chart displayed on an interface when the portion PartA (i.e., the first chart field or the first option) in the ring chart is selected and the portion PartB (i.e., the second chart field or the second option) in the ring chart is not selected, is different from data content of a column chart displayed on an interface when the portion part B in the ring chart is selected and the portion part A in the ring chart is not selected, thereby achieving data interaction between the ring chart and the column chart. On an eleventh interface F11, a publishing event switch item corresponding to the third data item is turned on (e.g., "click data item event"), so as to publish an event.

Figure 10:
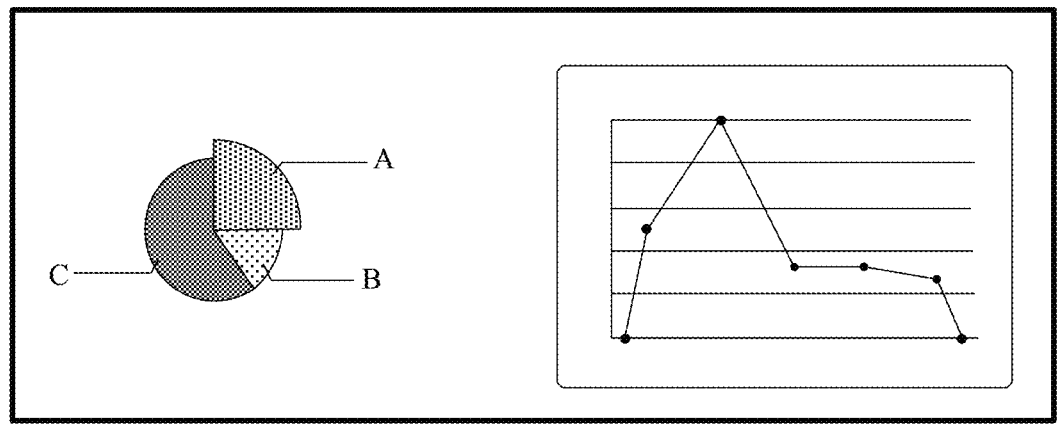
FIG. 10 is a schematic diagram of yet another interface of a data processing method, in accordance with some embodiments.
Figure 10:
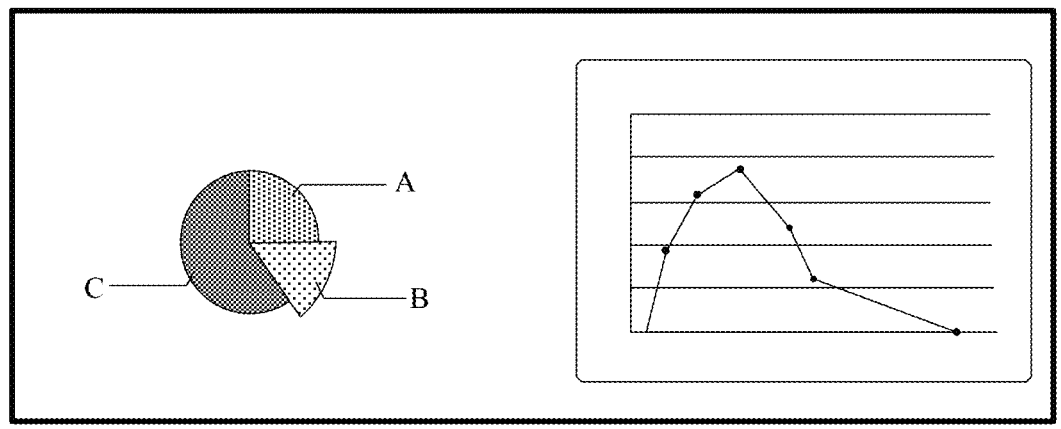

In some embodiments, the data processing method further includes: setting an update time of at least one of the first chart and the second chart as a preset time, so that the at least one of the first chart and the second chart is updated every preset time. For example, referring to FIG. 18A, on a twelfth interface F12, an update switch item (e.g., "automatic update switch") corresponding to a chart is turned on, and a preset time is input in an update time input box corresponding to the chart, so that the first chart re-obtains data every preset time. As a result, at least one third data item corresponding to the chart receives data that is transmitted by the second data item of the visualization component of the option group every preset time, and updates data content in the chart once. The twelfth interface and the fifth interface may be a same interface. For example, the preset time may also be a refresh period. For example, when the chart in part (A) of FIG. 18B is displayed, after 3 seconds, the chart displayed in part (B) of FIG. 10 is obtained, and data content of the two charts has changed. In this way, data corresponding to the first chart and data corresponding to the second chart may update in real time, and the latest data is displayed. In addition, the preset time may be determined according to actual conditions, which is not limited here. For example, the preset time may be 3 seconds, 5 seconds, 7 seconds, or the like.

Embodiments of the present disclosure provide a data processing method. The data processing method may be applied to the data processing device described above. The data processing method include:

configuring visualization component(s) of the option group, the option group including a first option and a second option, the visualization component(s) including first data items and second data items corresponding to the first data items, and the first data items being configured to distinguish the first option from the second option;

configuring a chart component including at least two third data items; and mapping at least one third data item in the chart component to the second data item, so that in a case where the at least one third data item in the chart component is mapped to the second data item corresponding to the first option, displayed chart(s) are the first chart(s), and in a case where the at least one third data item in the chart component is mapped to the second data item corresponding to the second option, the displayed chart(s) are the second chart(s).

For example, mapping the at least one third data item in the chart component to the second data item includes: binding a first variable in a data source corresponding to the second data item to a second variable, and binding the at least one third data item in the chart component to the second variable.

For example, binding the first variable in the data source corresponding to the second data item to the second variable includes: receiving the second variable input by the user in a binding input box of the second data item, so that the first variable in the data source corresponding to the second data item is bound to the second variable input in the binding input box.

For example, before the first variable in the data source corresponding to the second data item is bound to the second variable, the data processing method further includes: turning on a publishing event switch item corresponding to the second data item of the visualization component.

For example, mapping the at least one third data item in the chart component to the second data item includes: turning on the publishing event switch item corresponding to the second data item of the visualization component, binding the at least one third data item in the chart component to a placeholder written in the second data item, and turning on a receiving event switch item of the chart component, so that the at least one third data item in the chart component is mapped to the second data item.

In some embodiments, the data processing method further includes: setting a corresponding relationship between the first option and the first chart and a corresponding relationship between the second option and the second chart, so that when the first option is selected and the second option is not selected, displayed chart(s) are the first chart(s) corresponding to the first option, and when the first option is not selected and the second option is selected, the displayed chart(s) are the second chart(s) corresponding to the second option.

It will be noted that, specific implementations and beneficial effects of the data processing method are the same as specific implementations and beneficial effects of the data processing method in some of the embodiments described above, which may refer to description of the corresponding parts above, and will not be repeated here.

Embodiments of the present disclosure provide a data processing method. The data processing method may be applied to the data processing device described above. The data processing method include:

configuring an option group including a first option and a second option;

configuring a plurality of charts including first chart(s) and second chart(s);

setting a corresponding relationship between the first option and the first chart(s) and a corresponding relationship between the second option and the second chart(s), so that when the first option is selected and the second option is not selected, displayed chart(s) are the first chart(s) corresponding to the first option, and when the first option is not selected and the second option is selected, the displayed chart(s) are the second chart(s) corresponding to the second option.

It will be noted that specific implementations and beneficial effects of the data processing method are the same as specific implementations and beneficial effects of the data processing method in some of the embodiments described above, which may refer to description of the corresponding parts above, and will not be repeated here.

Figure 19:
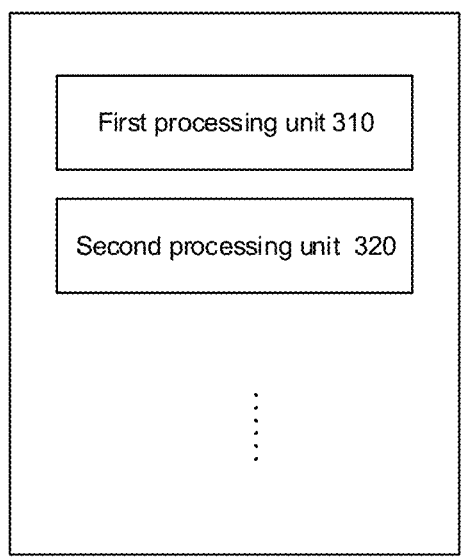
FIG. 19 is a diagram showing a structure of another data processing device, in accordance with some embodiments.

Embodiments of the present disclosure provide a data processing device. The data processing device may implement the data processing method in any one of the above embodiments. As shown in FIG. 19, the data processing device 300 includes a first processing unit 310 and a second processing unit 320.

The first processing unit is configured to display a first interface including an option group. The option group includes a first option and a second option. On the first interface, the first option is in a selected state, and the second option is in an unselected state; and the first interface further includes first chart(s) corresponding to the first option.

The second processing unit is configured to display a second interface including the option group in response to operation of selecting the second option in the option group on the first interface. On the second interface, the first option is in an unselected state, and the second option is in a selected state; and the second interface further includes second chart(s) corresponding to the second option.

In some embodiments, the data processing device further includes a third processing unit. The third processing unit is configured to set a corresponding relationship between the first option and the first chart, and a corresponding relationship between the second option and the second chart.

In some embodiments, the third processing unit is configured to set a corresponding item of the first chart as the first option, and set a corresponding item of the second chart as the second option.

In some embodiments, the third processing unit is configured to set the corresponding item of the first chart as the first option in response to first operation on a third interface, and set the corresponding item of the second chart as the second option in response to second operation on the third interface.

In some embodiments, the data processing device further includes a fourth processing unit. The fourth processing unit is configured to display the third interface. The third interface includes: the first chart or associated chart(s) of the first chart, and the second chart or associated chart(s) of the second chart. The associated chart of the first chart and the first chart belong to the first chart component. The associated chart of the second chart and the second chart belong to the second chart component.

In some embodiments, the third processing unit is configured to receive operation of selecting the first chart or the associated chart of the first chart on the third interface, and set the corresponding item of the first chart component as the first option; and receive operation of selecting the second chart or the associated chart of the second chart on the third interface, and set the corresponding item of the second chart component as the second option.

In some embodiments, the third processing unit is configured to: configure data items of the option group, the data items of the option group including first data items and second data items corresponding to the first data items, and the first data items being configured to distinguish the first option from the second option; create a third chart including at least two third data items; and map at least one third data item in the third chart to the second data item, in a case where the at least one third data item in the third chart is mapped to the second data item corresponding to the first option, the third chart being the first chart, and in a case where the at least one third data item in the third chart is mapped to the second data item corresponding to the second option, the third chart being the second chart.

In some embodiments, the third processing unit is configured to obtain the visualization component(s) of the option group. The option group includes the first option and the second option. The visualization component(s) include the first data items and the second data items corresponding to the first data items. The first data items are configured to distinguish the first option from the second option. It will be understood that the third processing unit is further used to configure the visualization component(s) of the option group.

Moreover, the third processing unit is further configured to obtain the chart component. The chart component includes at least two third data items. the third processing unit is further configured to map at least one third data item in the chart component to the second data item, so that in a case where the at least one third data item in the chart component is mapped to the second data item corresponding to the first option, displayed chart(s) are the first charts, and in a case where the at least one third data item in the chart component is mapped to the second data item corresponding to the second option, the displayed chart(s) are the second charts. It will be understood that the third processing unit is further used to configure the chart component.

In some embodiments, the third processing unit is configured to bind a first variable in a data source corresponding to the second data item to a second variable, and bind the at least one third data item in the chart component to the second variable.

In some embodiments, the third processing unit is configured to receive the second variable input by the user in the binding input box of the second data item, so that the first variable in the data source corresponding to the second data item is bound to the second variable input in the binding input box.

In some embodiments, the third processing unit is configured to obtain a plurality of charts, and the plurality of charts include first chart(s) and second chart(s). The third processing unit is further configured to set a corresponding relationship between the first option and the first chart(s), and a corresponding relationship between the second option and the second chart(s), so that when the first option is selected and the second option is not selected, displayed chart(s) are the first chart(s) corresponding to the first option, and when the first option is not selected and the second option is selected, the displayed chart(s) are the second chart(s) corresponding to the second option.

Embodiments of the device shown in FIG. 19 are merely exemplary. For example, division of the above units is merely logical function division, and there may be other division manners in actual implementation. For example, the units may be combined or may be integrated into another system, or some features may be ignored or not executed. Each functional unit in the embodiments of the present disclosure may be integrated into one processing module, or each unit may exist alone physically, or two or more units may be integrated into one module. Each unit in the data processing device may be implemented in form of hardware or in form of a software functional unit. For example, when implemented by using software, the first processing unit and the second processing unit, etc. may be implemented by using a software functional module generated after at least one processor reads program codes stored in a memory. The units may also be implemented by different hardware in the computer (the display device). For example, some units in the first processing unit, the second processing unit and the like are implemented by portions of processing resources (e.g., one core or two cores in a multi-core processor) in at least one processor. Remaining portions of the first processing unit, the second processing unit and the like are processed by remaining portions (e.g., other cores in the multi-core processor) of the at least one processor.

More details of the units in the data processing device implementing the above functions may refer to description in the embodiments of the corresponding method described above, which will not be repeated here.

The above embodiments may be implemented in whole or in part through software, hardware, firmware, or any combination thereof. When implemented by using a software program, it may be implemented in form of a computer program product in whole or in part. The computer program product includes one or more computer instructions. When the computer instruction(s) are loaded and executed on the computer, the processes or functions described in the embodiments of the present disclosure are generated in whole or in part. The computer may be a general-purpose computer, a dedicated computer, a computer network, or any other programmable device. The computer instruction(s) may be stored in a non-transitory computer-readable storage medium. The non-transitory computer readable storage medium may be any available media that may be accessed by the computer, or may include a data storage device such as a server or a data center including one or more available media. The available medium may be magnetic medium (e.g., floppy disk, magnetic disk or magnetic tape), optical medium (e.g., digital video disc (DVD)), or semiconductor medium (e.g., solid state drives (SSD)), etc.

It will be noted that, beneficial effects of the data processing device described above are the same as beneficial effects of the data processing method described in some of the embodiments, which will not be repeated here.

Some embodiments of the present disclosure provide a non-transitory computer-readable storage medium. The computer-readable storage medium stores computer program instructions. When the computer program instructions run on the processor, the computer implements the data processing method described in any one of the above embodiments, for example, one or more steps in the data processing method.

For example, the non-transitory computer-readable storage medium may include, but is not limited to a magnetic storage device (e.g., a hard disk, a floppy disk or a magnetic tape), an optical disk (e.g., a compact disk (CD), a digital versatile disk (DVD), a smart card or a flash memory device (e.g., an erasable programmable read-only memory (EPROM), a card, a stick or a key driver). Various computer-readable storage media described in the embodiments of the present disclosure may represent one or more devices and/or other machine-readable storage media for storing information. The term "machine-readable storage media" may include, but is not limited to, wireless channels and other various media capable of storing, containing and/or carrying instructions and/or data.

Some embodiments of the present disclosure further provide a computer program product. The computer program product includes computer program instructions that, when executed on a computer, cause the computer to perform the data processing method described in the above embodiments, for example, one or more steps in the data processing method.

Some embodiments of the present disclosure further provide a computer program that, when executed on a computer, causes the computer to perform the data processing method as described in the above embodiments, for example, one or more steps in the data processing method.

The non-transitory computer-readable storage medium, the computer program product and the computer program have the same beneficial effects as the data processing method as described in some of the embodiments of the present disclosure, which will not be repeated here.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A data processing device, comprising:
   at least one visualization component of an option group, the option group including a first option and a second option; and
   at least one chart component, wherein the at least one chart component has a subscription relationship with the first option of the option group, and is configured to display at least one first chart belonging to the at least one chart component in response to operation of selecting the first option; and the at least one chart component has a subscription relationship with the second option of the option group, and is further configured to display at least one second chart belonging to the at least one chart component in response to operation of selecting the second option; wherein
   the at least one visualization component of the option group includes first data items and second data items corresponding to the first data items, and the first data items are configured to distinguish the first option from the second option;
   the at least one chart component includes one chart component, and the chart component includes at least two third data items; and
   the chart component is configured to map at least one third data item in the chart component to a second data item corresponding to the first option so that the chart component has a subscription relationship with the first option, and map at least one third data item in the chart component to a second data item corresponding to the second option so that the chart component has a subscription relationship with the second option.

2. The data processing device according to claim 1, wherein the at least one visualization component of the option group is configured to publish a first event corresponding to the first option and a second event corresponding to the second option; and
   each chart component is configured to monitor an event published by the at least one visualization component of the option group, wherein
   the at least one chart component is configured to display the at least one first chart in response to the first event, and display the at least one second chart in response to the second event.

3. The data processing device according to claim 2, wherein the at least one visualization component of the option group includes one visualization component; or the at least one visualization component of the option group includes a plurality of visualization components, the plurality of visualization components include a first visualization component and a second visualization component, the first visualization component is configured to publish the first event corresponding to the first option, and the second visualization component is configured to publish the second event corresponding to the second option.

4. The data processing device according to claim 1, wherein the at least one visualization component of the option group is further configured to obtain a data source, and bind a first variable in the data source to the second data item corresponding to the first option or the second option; and
   the chart component is configured to bind the at least one third data item in the chart component to a second variable, so as to map the at least one third data item to the second data item corresponding to the first option or the second option.

5. The data processing device according to claim 1, wherein the chart component is configured to bind the at least one third data item in the chart component to a placeholder written in the second data item corresponding to the first option or the second option, so as to map the at least one third data item to the second data item corresponding to the first option or the second option.

6. The data processing device according to claim 1, wherein the at least one chart component is further configured to update at least one of a first chart and a second chart every preset time.

7. The data processing device according to claim 1, wherein the option group is a drop-down menu, and the first option and the second option are drop-down options of the drop-down menu; or
   the option group is a title menu, and the first option and the second option are title options of the title menu; or
   the option group is a chart, and the first option and the second option are chart fields of the chart.

8. A data processing method, comprising:
   displaying a first interface including an option group, the option group including a first option and a second option, the first option being in a selected state and the second option being in an unselected state on the first interface, and the first interface further including at least one first chart corresponding to the first option; and
   displaying a second interface including the option group in response to operation of selecting the second option in the option group on the first interface, the first option being in an unselected state and the second option being in a selected state on the second interface, and the second interface further including at least one second chart corresponding to the second option;
   wherein before displaying the first interface including the option group, the data processing method further comprises:

setting a corresponding relationship between the first option and a first chart, and a corresponding relationship between the second option and a second chart;

wherein setting the corresponding relationship between the first option and the first chart, and the corresponding relationship between the second option and the second chart includes:

setting a corresponding item of the first chart as the first option in response to first operation on a third interface; and setting a corresponding item of the second chart as the second option in response to second operation on the third interface.

9. The data processing method according to claim 8, further comprising:

displaying the third interface, the third interface including the first chart or an associated chart of the first chart, and the second chart or an associated chart of the second chart, the associated chart of the first chart and the first chart belonging to a first chart component, and the associated chart of the second chart and the second chart belonging to a second chart component; and setting the corresponding relationship between the first option and the first chart, and the corresponding relationship between the second option and the second chart including:

receiving operation of selecting the first chart or the associated chart of the first chart on the third interface, and setting a corresponding item of the first chart component as the first option; and receiving operation of selecting the second chart or the associated chart of the second chart on the third interface, and setting a corresponding item of the second chart component as the second option.

10. The data processing method according to claim 8, further comprising: setting an update time of at least one of a first chart and a second chart as a preset time, so that the at least one of the first chart and the second chart is updated every preset time.

11. A data processing method, comprising:

displaying a first interface including an option group, the option group including a first option and a second option, the first option being in a selected state and the second option being in an unselected state on the first interface, and the first interface further including at least one first chart corresponding to the first option; and displaying a second interface including the option group in response to operation of selecting the second option in the option group on the first interface, the first option being in an unselected state and the second option being in a selected state on the second interface, and the second interface further including at least one second chart corresponding to the second option;

wherein before displaying the first interface including the option group, the data processing method further comprises:

setting a corresponding relationship between the first option and a first chart, and a corresponding relationship between the second option and a second chart;

wherein setting the corresponding relationship between the first option and the first chart, and the corresponding relationship between the second option and the second chart includes:

configuring data items of the option group, the data items of the option group including first data items and second data items corresponding to the first data items, and the first data items being configured to distinguish the first option from the second option;

creating a third chart including at least two third data items; and mapping at least one third data item in the third chart to a second data item, in a case where the at least one third data item in the third chart is mapped to a second data item corresponding to the first option, the third chart being the first chart, and in a case where the at least one third data item in the third chart is mapped to a second data item corresponding to the second option, the third chart being the second chart; or wherein setting the corresponding relationship between the first option and the first chart, and the corresponding relationship between the second option and the second chart includes:

configuring at least one visualization component of the option group, the at least one visualization component including first data items and second data items corresponding to the first data items, and the first data items being configured to distinguish the first option from the second option; and configuring a chart component including at least two third data items, so as to map at least one third data item in the chart component to a second data item; in a case where the at least one third data item in the chart component is mapped to a second data item corresponding to the first option, a displayed chart being the first chart, and in a case where the at least one third data item in the chart component is mapped to a second data item corresponding to the second option, the displayed chart being the second chart; or wherein setting the corresponding relationship between the first option and the first chart, and the corresponding relationship between the second option and the second chart includes:

displaying a fourth interface including the option group in an initial state;

receiving operation of selecting the option group in the initial state on the fourth interface, and operation of configuring at least one visualization component of the option group, the at least one visualization component including first data items and second data items corresponding to the first data items, and the first data items being configured to distinguish the first option from the second option;

displaying a fifth interface including a third chart; and configuring a chart component including at least two third data items to which the third chart belongs, so as to map at least one third data item in the chart component to a second data item; in a case where the at least one third data item in the chart component is mapped to a second data item corresponding to the first option, a displayed chart being the first chart, and in a case where the at least one third data item in the chart component is mapped to a second data item corresponding to the second option, the displayed chart being the second chart.

12. The data processing method according to claim 11, wherein mapping the at least one third data item in the chart component to the second data item includes:

binding a first variable in a data source corresponding to the second data item to a second variable; and binding the at least one third data item in the chart component to the second variable; or mapping the at least one third data item in the chart component to the second data item includes:

turning on a publishing event switch item corresponding to the second data item of a visualization component;

binding the at least one third data item in the chart component to a placeholder written in the second data item; and turning on a receiving event switch item of the chart component, so that the at least one third data item in the chart component is mapped to the second data item.

13. A data processing device, comprising:

a memory storing one or more computer programs; and a processor coupled to the memory, the processor being configured to execute the one or more computer programs, so that the data processing device implements the data processing method according to claim 8.

14. An electronic apparatus, comprising:

the data processing device according to claim 1; and a display device configured to display interfaces.

15. A non-transitory computer-readable storage medium storing computer program instructions, wherein the computer program instructions, when run on a processor, cause a computer to implement the data processing method according to claim 8.

* * * * *